United States Patent
Amel et al.

(10) Patent No.: US 12,032,637 B2
(45) Date of Patent: *Jul. 9, 2024

(54) SINGLE CLICK DELTA ANALYSIS

(71) Applicant: Sumo Logic, Inc., Redwood City, CA (US)

(72) Inventors: Matt K. Amel, Campbell, CA (US); Christian Friedrich Beedgen, San Carlos, CA (US); Kumar Saurabh, Menlo Park, CA (US); Bruno Kurtic, Belmont, CA (US)

(73) Assignee: Sumo Logic, Inc., Redwood City, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/383,066

(22) Filed: Jul. 22, 2021

(65) Prior Publication Data
US 2021/0349953 A1 Nov. 11, 2021

Related U.S. Application Data

(63) Continuation of application No. 16/872,180, filed on May 11, 2020, now Pat. No. 11,188,619, which is a
(Continued)

(51) Int. Cl.
*G06F 16/951* (2019.01)
*G06F 16/248* (2019.01)
(Continued)

(52) U.S. Cl.
CPC .......... *G06F 16/951* (2019.01); *G06F 16/245* (2019.01); *G06F 16/248* (2019.01);
(Continued)

(58) Field of Classification Search
CPC ........ G06F 16/951; G06F 16/24; G06F 16/28; G06F 21/552; G06F 21/566; G06Q 10/06;
(Continued)

(56) References Cited

U.S. PATENT DOCUMENTS

| 5,960,411 A | 9/1999 | Hartman |
| 6,363,391 B1 | 3/2002 | Rosensteel, Jr. |

(Continued)

FOREIGN PATENT DOCUMENTS

| EP | 2871577 | 5/2015 |
| EP | 3403187 A1 | 11/2018 |

(Continued)

OTHER PUBLICATIONS

Rafei et al., "Querying time series data based on similarity," in IEEE Transactions on Knowledge and Data Engineering, vol. 12, No. 5, pp. 675-693, Sep./Oct. 2000.

(Continued)

*Primary Examiner* — Maher N Algibhah
(74) *Attorney, Agent, or Firm* — Schwegman Lundberg & Woessner, P.A.

(57) ABSTRACT

Single-click delta analysis is disclosed. A user query of status information collected from one or more monitored devices is received from a user. In response to receiving an indication from the user to determine a variance between different portions of the collected status information, a target query and a baseline query are generated using the user query. The generated target query and the generated baseline query are performed, respectively, against data in a data store including the status information collected from the one or more monitored devices. A target set of status information results and a baseline set of status information results are obtained in response to performing, respectively, the generated target query and the generated baseline query. The obtained target and baseline sets of results are combined. Output indicative of a variance between the target and baseline sets of status information results is provided based at least in part on the combining.

15 Claims, 40 Drawing Sheets

Related U.S. Application Data continuation of application No. 15/406,281, filed on Jan. 13, 2017, now Pat. No. 10,706,127.

(60) Provisional application No. 62/278,862, filed on Jan. 14, 2016.

(51) Int. Cl.
| | | |
|---|---|---|
| *G06F 16/28* | (2019.01) | |
| *G06F 16/245* | (2019.01) | |
| *G06Q 10/06* | (2023.01) | |
| *H04L 9/40* | (2022.01) | |
| *G06F 16/242* | (2019.01) | |
| *G06F 16/2458* | (2019.01) | |
| *H04L 43/0817* | (2022.01) | |
| *H04L 69/22* | (2022.01) | |
| *G06F 16/2455* | (2019.01) | |
| *G06F 21/55* | (2013.01) | |
| *G06F 21/56* | (2013.01) | |

(52) U.S. Cl.
CPC ...... *G06F 16/2428* (2019.01); *G06F 16/2462* (2019.01); *G06F 16/24568* (2019.01); *G06F 16/285* (2019.01); *G06F 21/552* (2013.01); *G06F 21/566* (2013.01); *G06Q 10/06* (2013.01); *H04L 43/0817* (2013.01); *H04L 63/08* (2013.01); *H04L 63/1408* (2013.01); *H04L 69/22* (2013.01)

(58) Field of Classification Search
CPC . H04L 43/0817; H04L 63/08; H04L 63/1408; H04L 69/22
See application file for complete search history.

(56) References Cited

U.S. PATENT DOCUMENTS

| | | | |
|---|---|---|---|
| 6,944,651 | B2 | 9/2005 | Onyon |
| 8,862,537 | B1 | 10/2014 | Kurtic |
| 8,943,001 | B1 | 1/2015 | Gupta |
| 9,953,094 | B2* | 4/2018 | Miura ................. H04N 21/2407 |
| 10,706,127 | B2 | 7/2020 | Amel et al. |
| 11,188,619 | B2 | 11/2021 | Amel et al. |
| 11,196,756 | B2* | 12/2021 | Seward ................. G06F 16/951 |
| 2003/0144988 | A1 | 7/2003 | Nareddy |
| 2008/0082564 | A1 | 4/2008 | Dettinger et al. |
| 2008/0103853 | A1* | 5/2008 | Watanabe .......... G06Q 30/0272 705/7.11 |
| 2008/0263105 | A1* | 10/2008 | Nakamura .......... H04L 43/0817 |
| 2009/0202970 | A1 | 8/2009 | Sridhar |
| 2012/0066065 | A1 | 3/2012 | Switzer |
| 2014/0040306 | A1 | 2/2014 | Gluzman |
| 2015/0007174 | A1 | 1/2015 | Jain |
| 2015/0120914 | A1 | 4/2015 | Wada |
| 2015/0135312 | A1* | 5/2015 | Wada ................... G06F 11/3409 726/22 |
| 2015/0254332 | A1 | 9/2015 | Hattori |
| 2016/0092286 | A1* | 3/2016 | Henley ................. G06F 11/079 714/57 |
| 2016/0224659 | A1* | 8/2016 | Robichaud ............ G06F 16/313 |
| 2016/0225271 | A1 | 8/2016 | Robichaud |
| 2016/0253425 | A1* | 9/2016 | Stoops ................ G06F 16/2255 707/754 |
| 2017/0228460 | A1 | 8/2017 | Amel et al. |
| 2020/0272622 | A1 | 8/2020 | Amel et al. |

FOREIGN PATENT DOCUMENTS

| | | |
|---|---|---|
| WO | 2014143145 | 9/2014 |
| WO | WO-2017/124024 A1 | 7/2017 |

OTHER PUBLICATIONS

Xu et al., "Problem Determination In Message-Flow Internet Services Based On Statistical Analysis of Event Logs", Master's thesis, University of Waterloo. 2009.
"European Application Serial No. 17739096.0, Response filed Apr. 28, 2022 to Communication Pursuant to Article 94(3) EPC dated Jan. 17, 2022", 11 pgs.
"European Application Serial No. 17739096.0, Communication Pursuant to Article 94(3) EPC dated Jan. 17, 2022", 7 pgs.
"U.S. Appl. No. 15/406,281, 312 Amendment filed May 11, 2020", 1 pg.
"U.S. Appl. No. 15/406,281, Examiner Interview Summary dated Oct. 9, 2019", 3 pgs.
"U.S. Appl. No. 15/406,281, Examiner Interview Summary dated Dec. 20, 2018", 3 pgs.
"U.S. Appl. No. 15/406,281, Final Office Action dated May 30, 2019", 16 pgs.
"U.S. Appl. No. 15/406,281, Non Final Office Action dated Sep. 20, 2018", 25 pgs.
"U.S. Appl. No. 15/406,281, Notice of Allowance dated Feb. 20, 2020", 15 pgs.
"U.S. Appl. No. 15/406,281, Response filed Oct. 7, 2019 to Final Office Action dated May 30, 2019", 7 pgs.
"U.S. Appl. No. 15/406,281, Response filed Dec. 7, 2018 to Non Final Office Action dated Sep. 20, 2018", 8 pgs.
"U.S. Appl. No. 16/872,180, 312 Amendment filed Jul. 19, 2021", 8 pgs.
"U.S. Appl. No. 16/872,180, Corrected Notice of Allowability dated Nov. 3, 2021", 2 pgs.
"U.S. Appl. No. 16/872,180, Non Final Office Action dated Feb. 8, 2021", 16 pgs.
"U.S. Appl. No. 16/872,180, Notice of Allowance dated May 19, 2021", 9 pgs.
"U.S. Appl. No. 16/872,180, PTO Response to Rule 312 Communication dated Oct. 21, 2021", 2 pgs.
"U.S. Appl. No. 16/872,180, Response filed May 4, 2021 to Non Final Office Action dated Feb. 8, 2021", 7 pgs.
"European Application Serial No. 17739096.0, Communication Pursuant to Article 94(3) EPC dated May 29, 2020", 4 pgs.
"European Application Serial No. 17739096.0, Extended European Search Report dated Jun. 28, 2019", 8 pgs.
"European Application Serial No. 17739096.0, Response filed Nov. 18, 2020 to Communication Pursuant to Article 94(3) EPC dated May 29, 2020", 12 pgs.
"European Application Serial No. 17739096.0, Response filed Dec. 2, 2019 to Extended European Search Report dated Jun. 28, 2019", 11 pgs.
"European Application Serial No. 17739096.0, Response to Communication pursuant to Rules 161(1) and 162 EPC filed Feb. 13, 2019", 9 pgs.
"International Application Serial No. PCT/US2017/013543, International Preliminary Report on Patentability dated Jul. 26, 2018", 8 pgs.
"International Application Serial No. PCT/US2017/013543, International Search Report dated Apr. 14, 2017", 2 pgs.
"International Application Serial No. PCT/US2017/013543, Written Opinion dated Apr. 14, 2014", 6 pgs.
"European Application Serial No. 17739096.0, Response filed Jun. 16, 2023 to Summons to Attend Oral Proceedings dated Feb. 6, 2023", 27 pages.

* cited by examiner

```
{ "name": "CollectorMessage", "type": "record",
  "fields": [
          { "name": "messageId", "type": "long" },
          { "name": "bladeId", "type": "long" },
          { "name": "source", "type": "CollectorSource" },
          { "name": "encoding", "type": "string" },
          { "name": "messageTime", "type": "long" },
          { "name": "payloadSize", "type": "int" },
          { "name": "payload", "type": "bytes" },
          { "name": "count", "type": "int", "default": -1 }
          ]
}, { "name": "CollectorSource", "type": "record",
  "fields": [
          { "name": "name", "type": "string" },
          { "name": "host", "type": "string" },
          { "name": "category", "type": "string" }
          ]
},
```

FIG. 3

SUMO LOGIC – SOURCE CONFIG (ADD SYSLOG SOURCE)

Type: ● UDP ○ TCP — 502

Port: 514 — 504

Name: — 506

Tags (Optional): — 508

Optional Context

Source Type: — 510
- Firewall
- IDS / IPS
- Routers
- UNIX / Linux
- ...

Source Vendor: — 512
- Cisco
- Juniper
- Sourcefire
- ...

Version:

Department: HR

Description:

Sign Out | Save

SUMO LOGIC – SOURCE CONFIG (ADD FILE/DIRECTORY SOURCE)   | Sign Out

Path: /var/log/*.log    [File Chooser] — 602, 604

Unix or Windows syntax accepted. You may also use the File Chooser. Specify a single path (e.g., /var/log/my.log), directory path (e.g., /var/log/), or partial path (e.g., /var/log/*.log)

Host(s):

List hosts, separated by commas. If omitted, local collector host is assumed.

Name:

Tags (Optional):

Optional Context

Source Type: Firewall / IDS / IPS / Routers / UNIX / Linux / ...

Source Vendor: Cisco / Juniper / Sourcefire / ...

Version:

Department: HR

Description:

[Save]

SUMO LOGIC – COLLECTOR MANAGEMENT (COLLECTOR LIST) | Sign Out

Available Collectors:

| Collector Name | Tags | Description | Status | On/Off | Delete | Clone |
|---|---|---|---|---|---|---|
| ▽ US West DC1 | West, PII | xxxxxx xxxxx | Running | STOP | | |
| ▽ US West DC2 | West, HR, ERP | xxxxxx xxxxx | Stopped | ▲ | | |

| Source Name | Tags | Type | Details | Status |
|---|---|---|---|---|
| Linux Srv 1 | HR | Remote tail | /var/log/*.log | Running | xxxxXXXxxxX |
| Firewall 1 | Perimeter | Syslog | UDP | Running | xxxxXXXxxxX |
| VPN | Perimeter | Syslog | TCP | Stopped | xxxxXXXxxxX |

} 324

| ▽ US East DC1 | East, Testing | xxxxxx xxxxx | Running | STOP | | |

+ Add New

Oct 27 10 57 16 HOST123 60d01h10m52s | STP VLAN 1 Port 16 STP State > LISTENING (MakeFwding)
Oct 27 10 57 16 HOST123 60d01h36m45s | STP VLAN 1 Port 16 STP State > DISABLED (PortDown)
Oct 27 10 57 16 HOST123 59d10h17m40s | STP VLAN 1 Port 6 STP State > DISABLED (PortDown)
Oct 27 10 57 16 HOST123 59d06h32m21s | STP VLAN 1 Port 2 STP State > LEARNING (FwdDlyExpiry)
Oct 27 10 52 33 HOST123 58d05h17m40s | STP VLAN 1 Port 4 STP State > DISABLED (PortDown)

FIG. 13A

\a+ \d+ \d+ \d+ HOST123 \d\dd\d\dh\d\dm\d\ds | STP VLAN 1 Port \d STP State >
(LISTENING \ (MakeFwding\) | DISABLED \ (PortDown\) | LEARNING \ (FwdDlyExpiry\))

FIG. 13B 2012-31-05 00:02:02 Controller start command received. ~1602
2012-31-05 00:02:03 Time taken to start controller is 0.4 ms. ~1604
2012-31-05 00:02:04 Controller is idle.
2012-31-05 00:02:05 Controller is idle.
2012-31-05 00:02:06 Controller is idle.
2012-31-05 00:02:07 Controller stop command received. ~1606
2012-31-05 00:02:08 Time taken to stop controller is 0.3 ms. ~1608
...
2012-31-05 00:04:44 Time taken to start controller is 0.7 ms.
...
2012-31-05 00:11:22 Time taken to stop controller is 0.5 ms.

FIG. 16A

```
char timebuf[128] ;
strftime(timebuf, sizeof(timebuf), "%Y-%m-%d %H:%M:%S", now) ;
fprintf(logfile, "%s Time taken to %s controller is %.1f ms.", timebuf, actiontype, actiontime) ;
```
⎫ 1652

| Messages | | | | |
|---|---|---|---|---|
| Display Fields | « ‹ Page: [1] of 93 › » | LogReduce | LogCompare ˅ | Create Anomaly Report |
| ⊙ Time | # Time | Message | | |
| * Message | 1 11/25/2016 12:14:59.949 -0800 | 2016-11-25 12:14:59, 949 -0800 IN pileQueue-reader-6] [auth=Custom time=0ms, rule=ExtractionRule(00 nodrop), true, Version(0), 00000000 Host: prod-forge-73˅ Name: /usr/sumo/logs/forge/forge.log˅ | 24 Hours 7 Days Custom... | e-73][module=forge] [localUse tionDefinition(Extract Excepti 1C8C, List(), 2016-10-28T13:08 Category: forge˅ |
| Hidden Fields | | | | |
| * Collector 97 | | | | |
| * Size | | | | |

SINGLE CLICK DELTA ANALYSIS

CROSS REFERENCE TO OTHER APPLICATIONS

This application is a continuation of U.S. patent application Ser. No. 16/872,180, entitled SINGLE CLICK DELTA ANALYSIS filed May 11, 2020 which is incorporated herein by reference for all purposes, which is a continuation of U.S. patent application Ser. No. 15/406,281, entitled SINGLE CLICK DELTA ANALYSIS filed Jan. 13, 2017, now U.S. Pat. No. 10,706,127, which is incorporated herein by reference for all purposes, which claims priority to U.S. Provisional Application No. 62/278,862, entitled SINGLE CLICK DELTA ANALYSIS filed Jan. 14, 2016 which is incorporated herein by reference for all purposes.

BACKGROUND OF THE INVENTION

Business and other entities are increasingly interested in capturing data associated with their computer networks for information technology (IT) security, IT operations, compliance, and other reasons. Unfortunately, analyzing that data can be difficult, expensive, and ineffective. One reason is that the data is voluminous and generated at a rapid rate, and significant work is typically required from expert contractors to identify relevant information from the large volumes of rapidly generated data.

BRIEF DESCRIPTION OF THE DRAWINGS

Various embodiments of the invention are disclosed in the following detailed description and the accompanying drawings.

FIG. 3 illustrates an example collector message format.

FIG. 5 illustrates an embodiment of a source configuration interface as rendered in a browser.

FIG. 6 illustrates an embodiment of a source configuration interface as rendered in a browser.

FIG. 8 illustrates an embodiment of a collector management interface as rendered in a browser.

FIG. 13A illustrates a subset of entries in a log file.

FIG. 13B illustrates an example of a regular expression.

FIG. 16A illustrates a subset of entries in a log file.

FIG. 16B illustrates a portion of a C program.

FIG. 24 illustrates an example embodiment of a user interface including clustered log message results.

FIG. 26 illustrates an example of a user interface for changing time ranges/shifts.

FIG. 28B is an example embodiment of a user interface for displaying delta analysis results.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
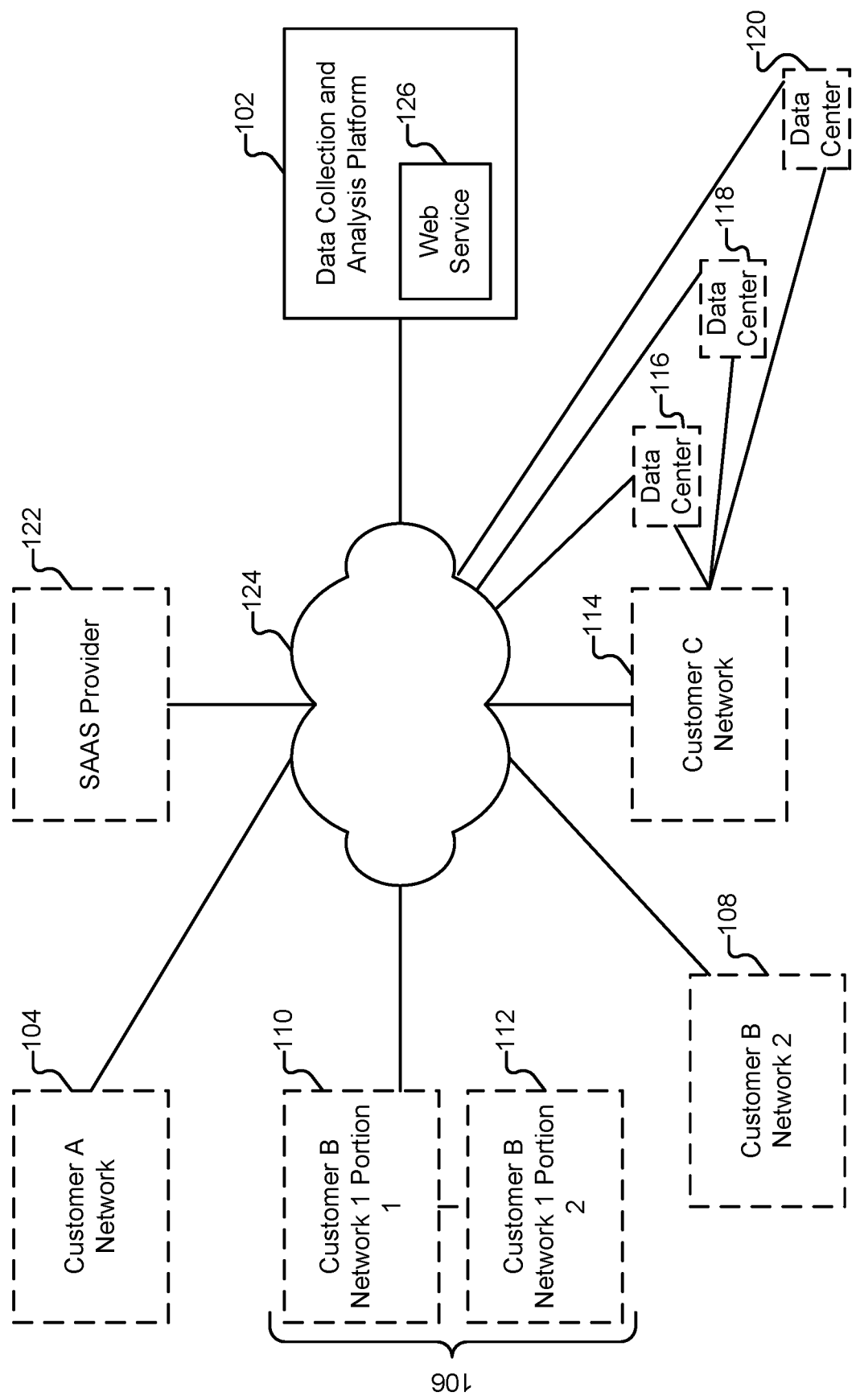
FIG. 1 illustrates an environment in which data, including event data, is collected and analyzed.

FIG. 1 illustrates an environment in which data, including event data, is collected and analyzed. In the example shown, three different customers (Customers A, B, and C) provide data to a data collection and analysis platform 102 (also referred to herein as "platform" 102) via network 124. Other elements may also provide data to platform 102, such as software-as-a-service provider 122 ("SAAS Provider" 122).

Customer A (also referred to herein as "Acme Company") maintains an enterprise network (104) at a single location. Included within the network are various desktop and laptop computers, commodity server-class hardware running various business applications and database software, and other devices typically deployed in an enterprise setting. As will be described in more detail below, data collectors can be installed within network 104 and configured to transmit data, including event data, to platform 102. The collectors are also configured to receive information from platform 102, such as configuration and control messages.

Customer A also makes use of services offered by SAAS Provider 122. SAAS Provider 122 is configured to report information associated with Customer A (and others of its customers) to platform 102. In particular, SAAS Provider 122 can provide both in-application log information, as well as lower level information (such as failed login attempts against Customer A's accounts). Using the techniques described herein, data provided by Customer A, and data provided on behalf of Customer A by SAAS Provider 122 can both be ingested into platform 102 and correlated. Other types of providers can also be integrated into the environment shown in FIG. 1 such as platform-as-a-service (PAAS) and Infrastructure as a Service (IAAS) and the techniques described herein adapted accordingly. SAAS, PAAS, and IAAS providers are referred to collectively herein as "third party service suppliers."

Customer B (also referred to herein as "Beta Corporation") is significantly larger than Customer A and maintains networks in multiple physical locations. For example, Beta Corporation has one office in Singapore and another in Denver, each with respective networks (106, 108). Collectors installed at network 108 are configured to communicate with platform 102. Network 106 is subdivided into two portions—one of which (110) is allowed to communicate with nodes outside network 106, and one of which is not (112). In this scenario, collectors installed within network 112 communicate with collectors installed within network 110 (a process also referred to herein as "collector chaining"), which in turn communicate with platform 102.

Customer C (also referred to herein as "Cool Co.") is similar in size to Customer A. In addition to maintaining an enterprise network 114, Customer C also leases servers that are located at data centers 116-120. Collectors are installed in network 114 and at data centers 116-120 and all of the collectors communicate information with platform 102.

Platform 102 is illustrated as a single logical device in FIG. 1. As will be described in more detail below, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task. In some embodiments, platform 102 is owned by or otherwise under the control of one of the parties described herein as being a customer (e.g., Customer B), or a partner, and use of the platform by other customers is omitted as applicable.

Figure 2:
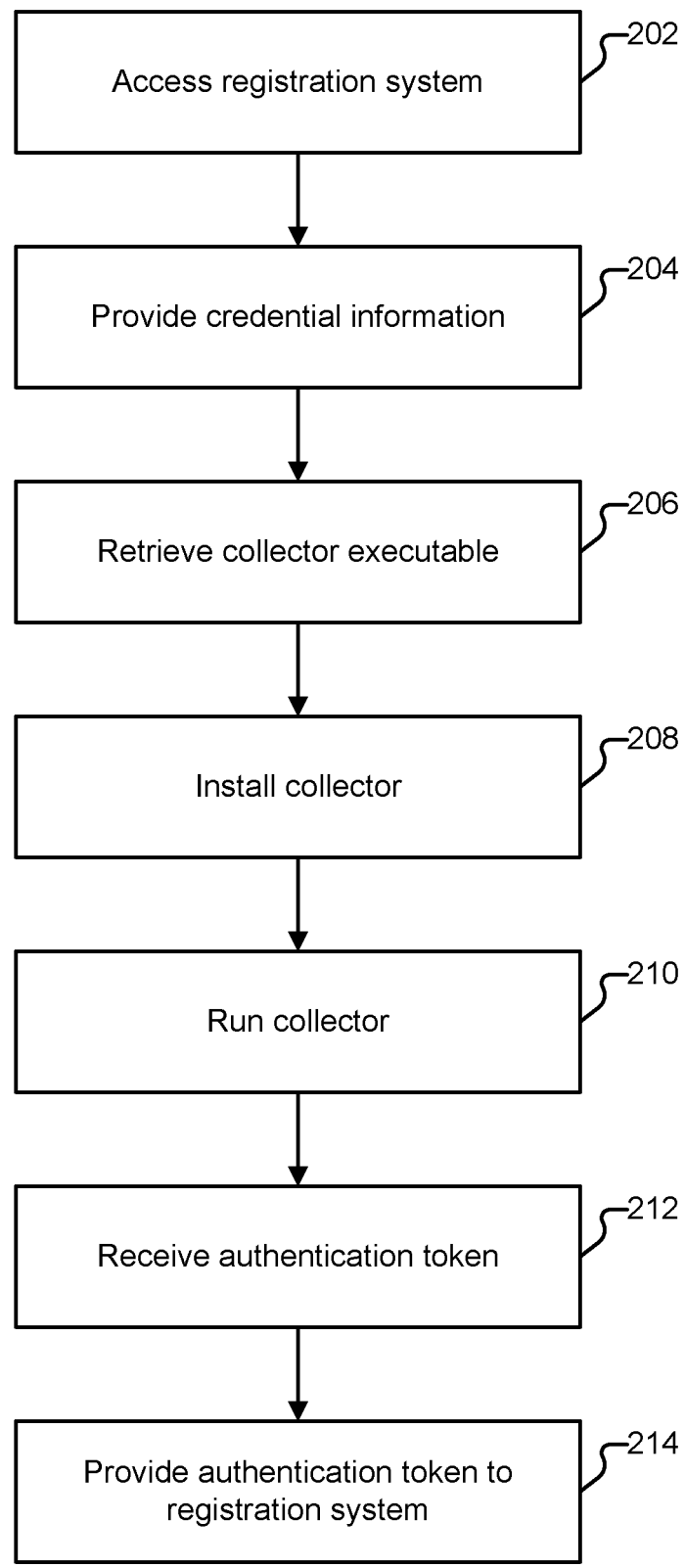
FIG. 2 illustrates an embodiment of a process for enrolling with a data collection and analysis platform.

FIG. 2 illustrates an embodiment of a process for enrolling with a data collection and analysis platform. In some embodiments the process shown in FIG. 2 is performed by an administrator, such as an administrator of network 104 (also referred to herein as "Alice"). The process begins at 202 when Alice accesses a registration system. As one example, at 202, Alice directs a web browser to a web interface provided as a service (126) by platform 102. At 204, Alice provides registration information, such as an email address and password, as well as information about Acme Company. Once Alice's registration information has been approved (e.g., after her email address has been verified), she will be presented with access to a collector executable (e.g., via a download page). Different versions of the collector executable exist for different operating systems. In particular, the application code can be wrapped with operating system specific techniques for installing services. For example, if Alice retrieves an executable (206) for a computer (e.g., her primary administrative console) running a Microsoft Windows operating system, the application will install itself in the Windows Service Manager. In the case of an Ubuntu Linux system, Alice would be instructed to copy an apt get.

At 208, Alice installs the collector. The retrieved collector can be, but need not be used on the computer with which Alice accesses the web interface to platform 102. For example, Alice may desire to install the collector on the Windows-based system but download the collector executable using the Linux-based system, a smartphone or tablet, or other appropriate device. As will be described in more detail below, collectors may be installed on a node to be monitored (e.g., a particular server) and may also be installed on a node that is in communication with a device to be monitored. For example, a collector may be installed on a server that is in communication with a router, printer, and/or other devices onto which a collector is not installed. One collector may collect data for a single device, but may also be configured to collect data from multiple devices, as applicable.

At 210, Alice runs the collector application. On first startup, the executable contacts web service 126 and requests an authentication code (received at 212). The executable instructs Alice to access the web interface using her browser and to enter as input to the collector application the authentication code (214), either via a GUI or via a command line, as applicable. In various embodiments, other credentials are used at portions 212 and 214 of the process. For example, an API key, a username and password, or combinations of credentials can be used as applicable.

As part of a successful registration, various records are created in databases maintained by platform 102. For example, an organization identifier is established for Acme Company and the collector is assigned an identifier that is associated with Acme Company's organization identifier. Other processes can also occur as part of a successful registration. For example, a credential can be generated and pushed to the collector by platform 102.

From an end-user viewpoint, once the authentication code is successfully input, the registration process ends. Alice will now be presented (via web service 126) with an interface to configure her collector, and will typically never directly interact with the collector executable again, nor will she need to manually edit any local configuration files. Instead, she will configure her collector(s) entirely through interfaces provided by web service 126. Any subsequently installed collectors can be configured to report to already installed collectors (e.g., in the chaining scenario described above in conjunction with networks 112 and 110) and can also be configured to report to platform 102 directly.

Collectors have global parameters, such as the amount of bandwidth that the collector can use when exchanging information with platform 102 and what size of cache the collector is allowed to use. If any changes need to be made, Alice is able to view and modify the collector configuration through web service 126. Alice can also define data retention management policies using web service 126. For example, she can specify durations for which data should be stored, whether in raw, or parsed format, and can do so with respect to different types of data. For example, Alice can specify that PCI-related data be stored for one year, while syslog data be stored for one month.

A collector acts as a container, or chassis, for "blades." A blade is a data retrieval mechanism. Each blade knows how to access one particular type of data and may be either passive (e.g., acting as a syslog server and receiving forwarded events) or may be active (e.g., able to log into a router using user supplied or other credentials and pull data). One example type of blade is able to tail a local file. Another type of blade is able to tail a remote file. Yet another type of blade can access a domain server and obtain events. Other blades are configured to access various data sources using vendor APIs. Multiple blades can be instantiated in a single collector, including multiple blades of the same type. For example, if multiple files (e.g., in different directories) are to be "tailed," in some embodiments one blade will be instantiated per file. In some embodiments, if the files to be tailed are located in the same directory, a single blade is used to tail all of those files. Multiple blades can also be configured to access the same file, and a single blade can be configured to access multiple files across multiple directories, as applicable.

Blades are configured to acquire data and provide it to the collector with which they are associated. As will be described in more detail below, the collector packages the information it receives from the blades into messages, which it transmits to a receiver on platform 102.

For some customers (e.g., for highly distributed customers with 2,000 sites), the registration process illustrated in FIG. 2 may not be practical. Other techniques can also be used to register users and/or collectors with platform 102. For example, 2,000 tokens might be pre-generated by platform 102 and distributed to the customer, along with pre-configured collectors/blades, with instructions for installing the collectors in an automated fashion.

In various embodiments, context data is obtained as part of the registration process and/or is obtained as part of a parallel process. As one example, at 208, when the collector is installed, a separate script executes, prompting the user to answer certain contextual questions about the network, such as what types of devices are present on the network and what their IP addresses are. As another example, the user may be prompted to upload a list of assets to platform 102 using a spreadsheet, a text file, or a dump from a Configuration Management Database (CMDB) system as part of portion 214 of the process shown in FIG. 2. As yet another example, a scanning tool, such as nmap, may be included in an install package (if not already present on the device onto which the collector will be installed). When the collector is run for the first time at 210, the scanner is also run. Based on any of these device discovery techniques (or other appropriate techniques, such as MAC detection), implicated blades can be recommended to the user, can be automatically configured for the collector, or some combination thereof. As one example, if an Apache web server is detected, a blade that tails the /var/log/apache directory of the server can be recommended. The context data can be periodically updated to discover changes to the network, including the addition of new components. For example, on a weekly or other basis, new scans can be performed (and/or any of the other discovery techniques can be repeated) and new blades can be pushed to the appropriate collector (or removed from the collector) as applicable.

As will be described in more detail below, contextual data can also be used to augment message information sent by collectors to platform 102. For example, if a customer has devices such as antivirus, LDAP, or IDM servers, role managers, CMDBs, and/or vulnerability data in their network, data from those sources can be provided to platform 102 as context data (i.e., separately from the messages sent by collectors). In some embodiments, users are asked a series of interactive questions, such as whether they have a CMDB or a network scanner, and based on the answers, solutions are recommended, such as "since you don't have a network scanner, click here to install one." Updates to context data can be sent to platform 102 on any appropriate schedule, such as by performing nightly or weekly refreshes, or by sending updates whenever changes are made.

FIG. 3 illustrates an example collector message format. As will be described in more detail below, multiple messages are packaged together by collectors (into "message piles") and transmitted to platform 102 (e.g., via HTTPS) in a compressed, encrypted form. Various portions of an example message format will now be described. Other message formats (omitting portions of the illustrated message and/or augmenting portions of the illustrated message) can also be used in conjunction with the techniques described herein, as applicable.

In the example shown, the "payload" is the raw data provided to the collector by a blade. One example of a payload is an entry in a firewall log indicating that a computer having a particular source IP address and port attempted to access a particular destination IP address and port at a particular time. Another example of a payload is an entry in a log file indicating that a particular security badge was used to access a particular door at a particular time. Another example of a payload is a credit card transaction that includes a date, amount, and description. Yet another example of a payload is a log from a software application indicating that a particular event took place at a particular time.

The payload for a syslog blade would be one line. For sources where a line terminator does not necessarily map to a semantic end of line (e.g., in the case of Java logs), the message payload may be multiple lines. Different techniques can be used to determine what should constitute the boundaries of a given payload. In the previous two examples (syslog and Java logs), the boundaries conform to a specification. For other formats, regular expressions can be used to determine patterns and suggest to the user (subject to confirmation/override) how to chunk the data into appropriately sized payloads.

The "messageId" is a primary key (assigned when the message is created) and the "bladeId" is the primary identifier of the particular blade that obtained the data. As mentioned above, a given blade reports its information to a given collector (which has its own collector identifier). Thus implicitly a "collectorId" can be associated with a given message without needing to be explicitly included in the message itself.

As illustrated in FIG. 3, "source" is a struct of "source-.name," "source.host," and "source.category"—metadata about the source of data that the blade is accessing. In an example where a blade is tailing a particular file, the "name" would be set to the name of the file being tailed. The "host" would be the IP address or hostname of the host from which the data is obtained, and the "category" corresponds to a user-defined category (e.g., "production server" or "testing").

Examples of "encoding" include UTF-8 and ASCII. In some embodiments, the "messageTime" is the time the message was created by the collector. In other embodiments, the "messageTime" is the time at which the data was collected, as that time is reported by the source of the data. For example, if the data is obtained from a device with a clock that is skewed by five minutes, in some embodiments the "messageTime" would be that skewed time instead of the collector's time. In various embodiments, both the time the message was created, and the reported time from the source are stored within the message. As will be described in more detail below, platform 102 can be used to enrich the contents of a message, including by inserting additional timestamp information. The "payloadSize" is the number of bytes to be expected in the aforementioned "payload."

Figure 4:
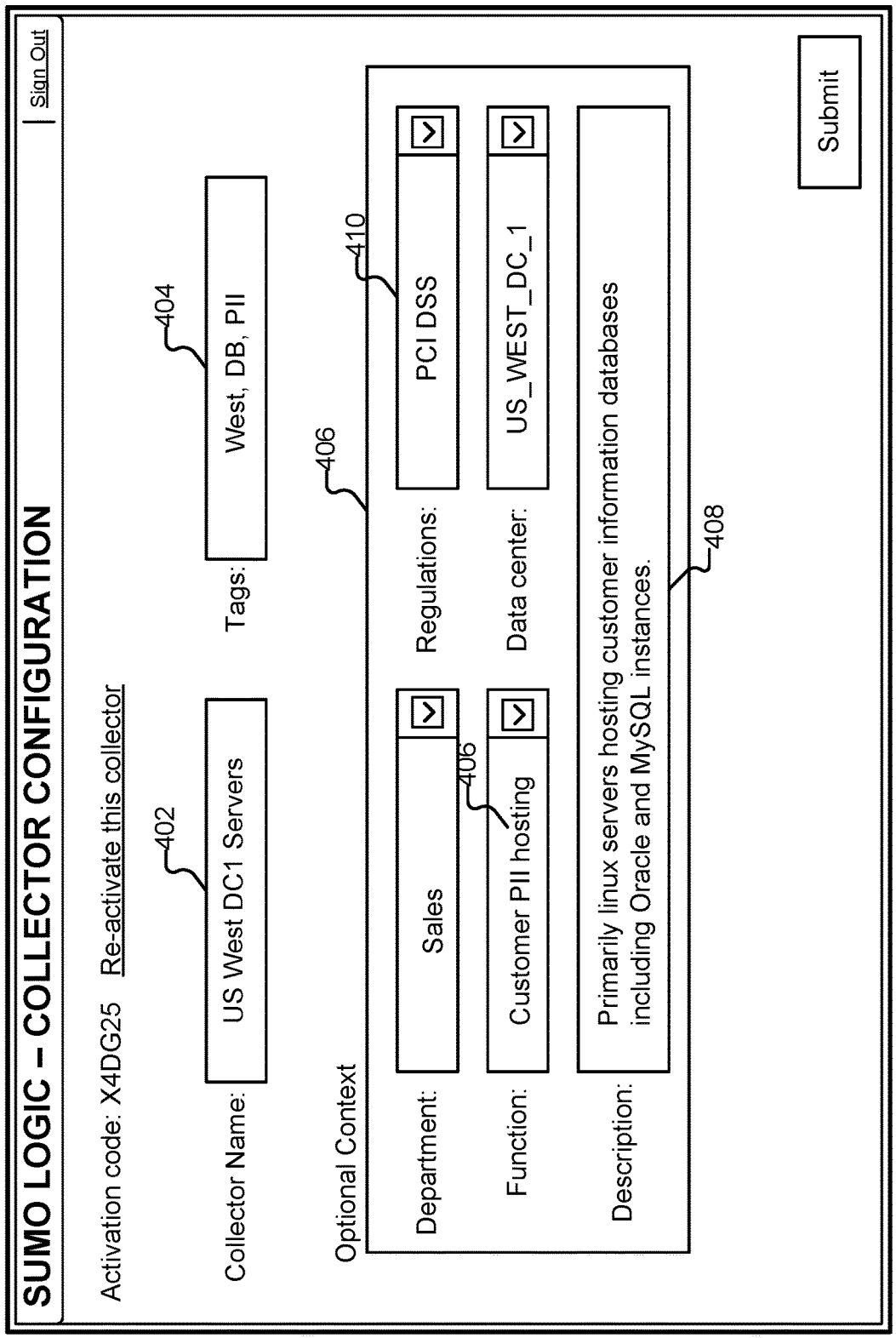
FIG. 4 illustrates an embodiment of a collector configuration interface as rendered in a browser.

FIG. 4 illustrates an embodiment of a collector configuration interface as rendered in a browser. In the example shown, an administrator at Cool Co. ("Charlie") has registered with platform 102, such as by using the process illustrated in FIG. 2. Charlie has entered the name of his collector in box 402 ("US West DC1 Servers") and provided applicable tags in box 404. In particular, the collector has been tagged with "West" (indicating that the collector is in the West Coast data center), "DB" (indicating that the collector is collecting information from database servers), and "PII," indicating that what is stored in those database includes personally identifiable information. In region 406, Charlie has specified various optional information, such as a description of the data sources (408) and that the data stored on the servers is subject to PCI DSS (410). Such tags can be used to partition data and significantly improve the amount of time it takes to process queries against that data.

FIG. 5 illustrates an embodiment of a source configuration interface as rendered in a browser. In the example shown, Charlie is configuring a particular blade. As with the interface shown in FIG. 4, the interface is provided by platform 102—not by a device sitting in network 114 or data centers 116-120. In the example shown, Charlie is configuring a syslog blade. Default settings for the blade (e.g., that UDP and port 514 will be used) are automatically populated, but can be changed by selecting radio button 502 or dropdown 504. Other applicable information, such as name and tag information are specified in boxes 506 and 508.

In region 510, Charlie can indicate the type of source associated with the syslog, such as by specifying that it is a firewall or that it is a router. If he selects a source type, shared settings (i.e., shared by all firewall sources) can be populated into the blade configuration, such as tag information. Other types of sources (not shown) include Confluence logs and other application logs. Tag information and/or other metadata (whether specified in a collector configuration interface or a blade configuration interface) is, in various embodiments, added to or otherwise associated with messages by platform 102, rather than that information being added by a given collector or blade.

In region 512, Charlie can indicate the vendor of the source. In various embodiments, information such as source vendor and version may be omitted by Charlie during initial configuration, but be subsequently automatically populated (or populated subject to Charlie's approval) once messages are received from that blade (e.g., based on metadata or other indicators of vendor/version). In various embodiments, Charlie is provided with the ability to override system assumptions, such as hostname information. For example, if a server from which data (e.g., log data or other event data) is being collected is a virtual computer provided by Amazon Elastic Compute Cloud (EC2), the default hostname assumed for that server may be unwieldy. Charlie is able to specify a more appropriate hostname as applicable, using an interface such as is shown in FIG. 5.

FIG. 6 illustrates an embodiment of a source configuration interface as rendered in a browser. In the example shown, Charlie is configuring a "tail" blade. As with the interfaces shown in FIGS. 4 and 5, the interface shown in FIG. 6 is provided by platform 102. Instructions for how to configure the blade are provided to Charlie, such as in region 602. In the example shown, Charlie has manually entered a path (/var/log/*.log) to logs that reside on his administrative workstation, a Debian Linux system. In other contexts, Charlie could also have chosen to specify a remote file (or directory) location manually, and could also use the File Chooser button (604) to specify what log file(s) he would like to tail.

The interface shown in FIG. 6 can be used in conjunction with a variety of devices. As one example, some routers support logging via syslog. The router's logs can be sent to platform 102 by having an administrator make sure the logging functionality is enabled in the router, and configuring a blade to receive that log information as a syslog server. In various embodiments, configuring the router is an automated task performed by the collector application. For example, Charlie could be prompted for credential information associated with the router (e.g., the router administration login and password) and the collector application could use that information to configure the correct syslog port and other information on the router. Once configured, the router will provide log information to the blade, which provides the data to a collector which in turn transmits it to platform 102.

Other types of blades can be configured using interfaces similar to those shown in FIGS. 5 and 6, with appropriate modifications. One example is an "active" blade that logs into a particular vendor's router or otherwise communicates with the router (e.g., via an API). The configuration interface for the blade could include a region into which an administrator would enter a login or password (or other credential such as a certificate or token). Other options, such as how frequently to retrieve information from the router would also be specified in the configuration interface. As another example, in the case of a "remote tail" blade, information such as an ssh key, or NFS mount information could be provided in the blade configuration interface. As yet another example, a blade could be configured to periodically access an FTP drop site for data using supplied credentials. In various embodiments, the collector to which the blade provides data is responsible for breaking the file retrieved from the FTP site (or other multi-line data source) into discrete messages.

Figure 7:
FIG. 7 illustrates an embodiment of a collector management interface as rendered in a browser.

FIG. 7 illustrates an embodiment of a collector management interface as rendered in a browser. In the example shown, Charlie has configured two additional collectors with platform 102—one at data center 118 (702) and one at data center 120 (704). The collector that Charlie configured using the interface shown in FIG. 4 appears in region 706. Suppose Charlie wishes to modify the configuration of collector 702. To do so, he clicks on link 708 and will be presented with an interface similar to the one shown in FIG. 4. If Charlie clicks on a tag, such as "West," only those collectors having that tag (collectors 706 and 702) will be displayed in interface 700. If Charlie clicks on "Running" link 710, a search for the collector's log files will be launched. Charlie can start and stop a given collector by selecting one of the icons depicted in On/Off column 712. He can delete a collector by selecting one of the icons depicted in column 714. Charlie can create a new collector by either selecting button 718, or by cloning one of the existing collectors by selecting one of the icons depicted in column 716.

FIG. 8 illustrates an embodiment of a collector management interface as rendered in a browser. Charlie selected icon 708 in the interface shown in FIG. 7 and was presented with the interface shown in FIG. 8 as a result. In particular, by selecting icon 708, Charlie has exposed a list of the blades in region 324. As with the collectors, Charlie can modify, delete, and/or add new blades by interacting with the interface shown in FIG. 8 or other appropriate interfaces. Any changes made to collectors or to blades by Charlie (e.g., through the interfaces shown herein) will be transmitted by platform 102 to the implicated collector and take effect immediately.

In various embodiments, the collector is a microkernel and the blades can be plugged in and removed without modifying the microkernel itself. Using the techniques described herein, only those blades required for data collection at a given site need be present. If new blades are subsequently needed (e.g., because a customer has installed new hardware), only those needed blades need be sent by platform 102 to the collector. Similarly, if a given blade ceases to be needed by a collector (e.g., because the last instance of the blade has been removed from the collector's configuration), it can be removed.

Figure 9:
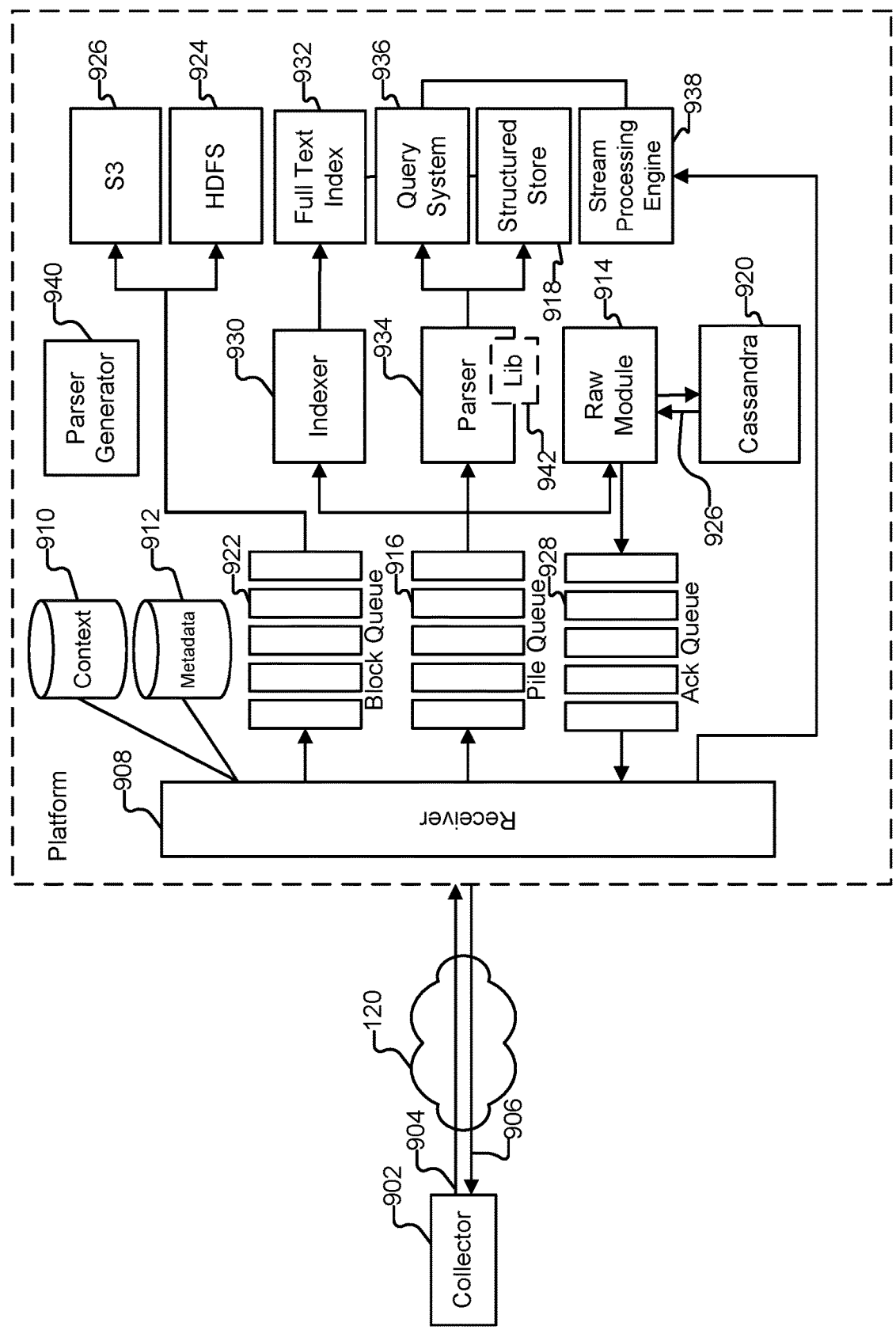
FIG. 9 illustrates an embodiment of a data collection and analysis platform.

FIG. 9 illustrates an embodiment of a data collection and analysis platform. In the example shown, collector 902 communicates with platform 102 via a receiver 908 using bidirectional communications (904/906). In particular, collector 902 sends message piles (e.g., containing 300 messages) to platform 102, optionally sends context data, and receives configuration and command messages from platform 102. In various embodiments, collector 902 also receives information for other devices from platform 102, such as by receiving alerts or remediation information to be provided by the collector to a remediation device or an administrative console.

Collector 902 also periodically sends heartbeats to platform 102. In various embodiments, collector 902 is configured to send a heartbeat to platform 102 each time more than 5 seconds (or another appropriate length of time) have elapsed since the collector last sent a communication (whether another heartbeat, or a message pile, or context data). If platform 102 notices that the heartbeats it receives from collector 902 have become sporadic or stopped entirely, platform 102 is configured to notify one or more appropriate entities. As one example, Alice may configure platform 102 to email her in the case of any detected failures of any collectors associated with Acme Company. Alice may also configure platform 102 to email an alias or group of administrators, and/or to generate alerts via other communication channels, such as sending a text message to her phone.

Database 910 is configured to store received context data in context tables. Other appropriate data structures may also be used, as applicable, depending on the nature of the context data. The context data can be mapped to portions of the data received via the message piles. For example, a given blade (having a particular blade identifier) may be associated with a particular end user workstation. Information about that user may also be received as context data obtained from Active Directory or another appropriate source. As described in more detail below, such context information is an example of data that can be used to augment messages.

Database 912 is configured to store various types of metadata. In the example shown, database 912 is distinct from raw store 920 (a distributed database). In various embodiments, database 912 (and/or database 910) are also stored by raw store 920.

In various embodiments, receiver 908 is configured to support the Avro remote procedure call and binary serialization framework. Accordingly, while collector 902 could transmit individual messages (e.g., in JSON or XML), efficiencies can be achieved by encapsulating multiple messages into a serialized compact binary format.

When a message pile is received from collector 902, receiver 908 extracts the individual messages included in the pile and enriches the messages as applicable. One benefit of enriching a message is that when the message is indexed, the result will be more useful when performing searches (e.g., by allowing the data to be partitioned in more ways). In various embodiments, messages comprise key-value pairs. Messages are enriched through the addition of other keys. The original raw data is not altered. As will be discussed in more detail below, such a message format allows platform 102 to parse and subsequently reparse message information in a versionable manner.

One example of message enrichment is the addition of various identifiers. Individual messages as created by a collector need not include a blade identifier or collector identifier (or organization identifier) at creation time. All of the messages in the pile were created based on information provided from a single blade. Accordingly, instead of including the blade identifier inside every message, the collector may stamp the message pile with the blade identifier. There is no need for the collector to stamp the pile with a collector identifier or organizational identifier because that information can be determined based on information stored in metadata database 912. Accordingly, one type of enrichment that can be performed by receiver 908 is to insert blade/collector/organizational identifiers into messages as applicable. As another example, user-supplied tag information, inferred metadata, and explicit instructions for augmenting specific fields (e.g., simplifying hostname information) can be included in the message by receiver 908.

Another type of enrichment that can be performed by receiver 908 is the addition of timestamps to messages. Suppose, as explained above in conjunction with FIG. 3, the "messageTime" portion of a message indicates the time that a given message was created by a collector. The message payload may include timestamp information that is distinct from the messageTime. For example, a particular log entry may pertain to a device with a misconfigured system clock (e.g., set to the wrong day) or may have been batch processed by a collector such that the amount of time elapsed between when the log entry was originally generated and when it was processed by the collector is different. In such cases, platform 102 can extract the value included within the log entry and enrich the message with another field, such as "sourceTime." If the value included within the log entry is incomplete (e.g., the log entry says "March 21" but omits the year), receiver 908 can ensure that the sourceTime is stored in a canonical form. Another example of a timestamp that can be used to enrich a message is the time that the receiver received the message pile.

Yet another example of enrichment is the creation of a digest of the message (e.g., based on a combination of the message and the associated organization identifier). The digest can be used for audit purposes (e.g., for the detection of tampering) and can also be used in other ways. As one example, platform 102 is a multitenant system. It is possible that data for two different customers will wind up in the same address spaces. Probes can be introduced into the overall call stacks that make explicit the call context: this call is being made on behalf of a particular user at a particular organization. As data is being assessed or produced, the actual message digest along with the organization identifier can be used to re-perform the digest computation as a check with whatever organization identifier is received from the current call context. Checks may be performed for all method calls, but may also be used on a subset of calls, such as for efficiency purposes.

Receiver 908 provides output to various components of platform 102. As one example, it places (enriched) message piles into pile queue 916. One consumer of pile queue 916 is raw module 914, which is responsible for storing message piles to one or more raw data stores. In various embodiments, the raw data store(s), rather than structured store 918 is used as the system of records. In the example shown, the raw data store is the distributed database management system Cassandra, and is used as a near term store. Cassandra has as properties that it is very fast at both reads and writes. Messages are stored in Cassandra (920) for one week. In addition, because it is a distributed system, an acknowledgement of successful write from Cassandra (926) is a good indicator of a durable write. Upon receipt of the acknowledgement, the raw module notifies (via acknowledgement queue 928) the receiver, which in turn sends an acknowledgement back to the collector. As the message piles being stored are relatively small (e.g., 300 messages), latency between when the collector transmits a pile and when it receives an acknowledgement of durable write is minimized. The piles sent by the collector and for which the acknowledgement of durable write are ultimately received include an identifier, generated by the collector. In some embodiments the acknowledgement of durable write sent back to the collector includes the applicable identifier.

Receiver 908 also places message data, repackaged into blocks, into block queue 922. Longer term storage of large files is typically more efficient than longer term storage of smaller files. Accordingly, the blocks are significantly larger than piles, and include the contents of multiple piles inside. The blocks are sent to a Hadoop Distributed File System (HDFS) 924, where they are stored for 30 days, and to Amazon S3 (926) where they are stored indefinitely. When receiver 908 generates a block, a block identifier is created and stored in metadata database 912. Additional information such as what time range it spans, whether it has been sent to S3 yet, and other applicable information is also stored in database 912. The block identifier is also associated with each of the piles whose contents are placed into the block. One way of performing such a linking is as follows: When a pile is first received from a particular organization, a new block is generated in parallel. One of the enrichments made to the pile prior to storage in raw store 920 is the block identifier.

The metadata stored in database 912 is usable to resolve queries more quickly. For example, if a query requesting the raw data for a given customer during a given time range is requested, an intersection of all the time ranges of all possible blocks can be made, thus identifying those blocks that do not need to be opened.

Queue 916 is also consumed by indexer 930 which creates a full text index 932. In some embodiments, indexer 930 receives piles from pile queue 916, examines the data in each message, and prepares the message for full text indexing by extracting tokens and building an inverse index using Lucene.

Parser engine 934 parses messages in the pile queue and stores the results in structured store 918 in accordance with an applicable schema. In various embodiments, parser engine 934 includes a library 942 of parser rules/schemas. If the message has an associated source type (e.g., specifying that the message is from an Apache server, or that it is a credit card transaction), the corresponding rule set will be selected from the library and applied when parsing. If the source type has not been specified, efficient parsing of the message can nonetheless be performed by platform 102. As will be described in more detail below, an appropriate rule set can be automatically selected from the library and used (conceptually, turning parser engine 934 into an Apache parser or credit card transaction parser), by performing a heuristic or other evaluation of the message (or sequence of messages). In some cases, a preexisting parser rule set may not exist for a given message. As will also be described in more detail below, an appropriate rule set can be automatically generated (e.g., by parser generator 940) and ultimately stored in the parser library.

In the example shown in FIG. 9, a single parser engine 934 is depicted. In various embodiments, multiple parsing engines are present within platform 102 and rules are tagged with which parsing engine(s) they pertain to. For example, one parsing engine may be configured to support the parsing of plaintext messages, while another parsing engine may be configured to support the parsing of binary data.

As explained above, structured store 918 need not serve as a system of record. Instead, structured store 918 is used as a performance optimization so that structured analytics do not need to constantly parse and reparse raw data. Indeed, because the raw message information is preserved, at any time (e.g., if improved parsers are developed), the data in the structured store (or portions thereof) can be erased and replaced, or augmented, as desired. For example, as explained above, a first customer might provide to platform 102 a rule set/schema for handling log files from an obscure application. Suppose a second customer of platform 102 (and user of the same application) initially uses the tools supplied by the first customer to store data in the structured store. The second customer subsequently improves those tools. Both customers are able to reparse (or augment, depending on how the rule set/schema have been modified) their data based on the improvements.

Stream processing engine 938 has a direct connection from the receiver and allows users such as Alice and Charlie to obtain real time information about their systems.

Query system 936 supports (e.g., via web service 126) the ability of users such as Alice and Charlie to perform queries against their data. Cross-customer data analysis can also be performed. In some embodiments query system 936 is an SQL query engine and supports batch oriented queries. In various embodiments, query system 936 pulls together data from raw module 914, structured store 918, and stream processing engine 938, and use techniques such as full text indexing to apply those sources against the input data—either individually or in combination.

Figure 10:
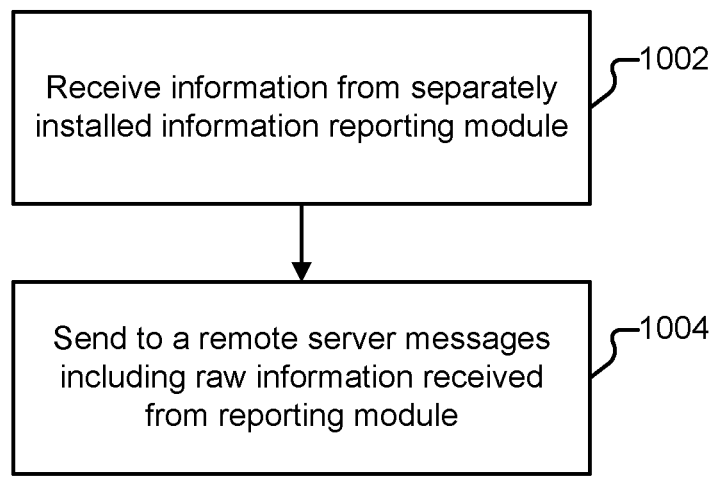
FIG. 10 illustrates an embodiment of a process for collecting and transmitting data.

FIG. 10 illustrates an embodiment of a process for collecting and transmitting data. In some embodiments the process is performed by a collector, such as collector 902. The process begins at 1002 when information from a separately installed information reporting module is received. As one example, at 1002, information from a syslog blade is received by collector 902. At 1004, messages, including the raw information received at 1002, are sent to a remote server. As one example, at 1004, collector 902 transmits a message pile to platform 102.

Figure 11:
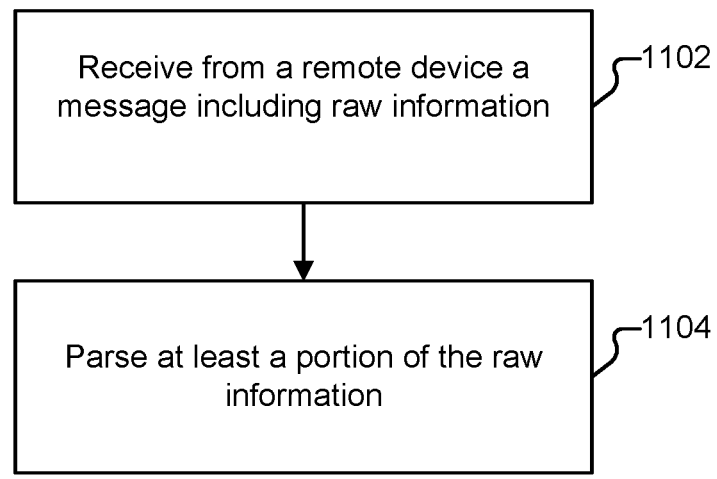
FIG. 11 illustrates an embodiment of a process for receiving and processing data.

FIG. 11 illustrates an embodiment of a process for receiving and processing data. In some embodiments the process is performed by platform 102. The process begins at 1102 when a message is received from a remote device. Included in the message is raw information. One example of raw information is unparsed information. At 1104, at least a portion of the received raw information is parsed.

Automatic Parser Selection and Usage

In various embodiments, customers of platform 102 (and/or vendors) are able to submit parser rule sets/schema to platform 102. The ability to access the submissions may be restricted in use to the submitting customer, but can also be designated for use by other customers. As one example, suppose Acme Company uses a relatively obscure application that provides as output various log files. Alice has configured a blade to supply the log files to platform 102, and the raw data is ingested into platform 102 and stored (e.g., in raw store 920). Initially, no rule sets/schema customized to the application's logs are present in library 942. Even without such tools, the received message data can nonetheless also be included in structured store 918 (if desired). For example, included in library 942 are various token definitions which can be used to recognize pieces of the syntax of the application log. Examples include IP addresses, IPv6 addresses, email addresses, usernames, date formats, and credit card numbers. In some embodiments, when such tokens are used, Alice is presented (e.g., via web service 126) with an interface asking her to confirm the tokenizations proposed by platform 102, and asking her to supply additional information about the application. As one example, Alice would be asked to confirm whether data extracted from a particular field corresponds to a date. Techniques for automatically generating a parser are described in more detail below.

Suppose Alice (either internally within Acme or in cooperation with the application's vendor) develops a full set of parser rules/schema for the application and supplies them to platform 102. Later, when a second customer of platform 102 begins using the same application, Alice's contributions will be available to parse the second customer's data, without the second customer having to expend the effort (and/or money) to develop its own set of tools. The second customer can be made aware of Alice's tools in a variety of ways. As one example, after Alice has supplied rules/schema to platform 102's library, the application can be included in the source type/source vendor options presented in interfaces such as interface 500, allowing the customer to select them. As another example, as with any other blade for which source type information has not been configured, platform 102 can attempt to automatically select an appropriate parser for that data and recommend it to the blade's administrator. A process for performing such automatic selection (whether of common rule sets, such as those for Apache logs, or of more obscure rule sets, such as may have been provided by customers) will now be described.

Figure 12:
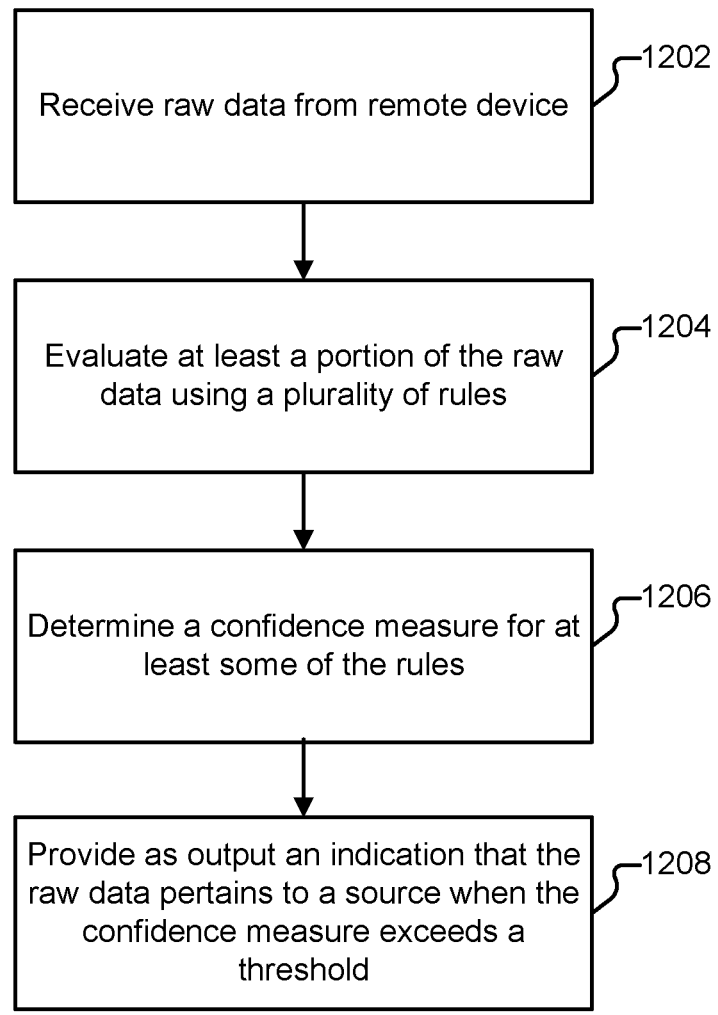
FIG. 12 illustrates an embodiment of a process for automatically selecting a parser.

FIG. 12 illustrates an embodiment of a process for automatically selecting a parser. In some embodiments the process shown in FIG. 12 is performed by platform 102. The process begins at 1202 when raw data is received from a remote source. In some embodiments portion 1202 of the process shown in FIG. 12 corresponds to portion 1102 of the process shown in FIG. 11.

Suppose Charlie has configured a blade using interface 600. Charlie has not specified a source type (or vendor) for the data. At 1204, the raw data is evaluated against a plurality of rules. As one example of the processing performed at 1204, the raw data could be evaluated (e.g., in sequence) against every rule included in library 924 by parser engine 934. As another example, in some embodiments parser engine 934 is implemented as a finite state machine and rules are evaluated in parallel. At 1206, a confidence measure is determined.

As one example of the processing performed at 1204 and 1206, the first 1,000 lines of raw data received from a blade at 1202 are evaluated against each rule in library 924. Suppose the confidence measure for the raw data with respect to an Apache access log parser is 0.999, with respect to a particular vendor's router parser is 0.321, and with respect to a credit card transaction parser is 0.005. A determination is made that the confidence measure with respect to the Apache access log parser exceeds a threshold, indicating that the received raw data is Apache log data (and in particular, access log data), with a very high confidence. As another example, as a result of processing by parser engine 934, a determination of "match" or "not match" could be made. A determination of a "match" corresponds to a high confidence value. At 1208, an indication that the raw data is Apache access log data is output.

The output of the process shown in FIG. 12 can be used in a variety of ways. As one example, the blade that provided the raw data can have its configuration updated to include an appropriate source type (and/or vendor type and version number as applicable). The configuration can be performed automatically and can also be subject to administrator approval. Data received from the blade in the future will be labeled in accordance with the source type and the determined source type can also be retroactively associated with data previously received from the blade, as applicable. For example, metadata database 912 can be updated to include the blade's source information and data already stored in either raw storage or in the structured store can be updated to reflect the newly determined source information. In the case of syslog data (which aggregates log data from multiple applications), the source type could remain set to syslog, however, individual messages of the respective contributors to the log (e.g., ssh) can be labeled.

Suppose a determination has been made, through the process shown in FIG. 12, that a given blade is supplying raw data that corresponds to a source type of an Apache access log. Also suppose that when raw data received from the blade is parsed using Apache access log parser rules, 2% of the raw data is unparseable. This may be an indication that the parser rules are out of date and need to be updated (e.g., because a new version of Apache is creating slightly different log data). In some embodiments, an administrator of platform 102 (or other appropriate entity) is alerted to the discrepancies. The process shown in FIG. 12 can be employed to detect a blade that has the wrong source type set. For example, if Alice has inadvertently designated the source type of a blade as being Apache access log data, when it is in fact data pertaining to a wireless router, platform 102 can determine that the received raw data is largely unparsable (using the Apache parser rules), execute the process shown in FIG. 12 to determine whether a more appropriate source type should have been set, and recommend to Alice that she change the source type (or automatically change it for her).

Another example of how the output generated at 1208 can be used is as follows. When parsing engine 934 parses data from the blade in the future, whether as part of an initial parse as the data is included in structured store 918, as part of a reparsing operation, or in conjunction with other types of parsing, such as may be performed by stream processing engine 938, a particular parser can be automatically selected. The specific parser need not be specified, as parser engine 934 can be configured to always evaluate all messages using all rules. However, by narrowing down the set of rules to be used when parsing, the amount of computing resources required to process the data can be reduced.

The output of the process shown in FIG. 12 can be used to automatically select a schema for which portions of the raw data should be extracted (and how they should be labeled). For example, while a particular raw message may include a total of ten columns' worth of data, the selected schema may state that the first column ("time") and third column ("temperature") should be extracted separately from the other columns, that column two should be discarded, and that columns four through ten should be merged into a single column in the structured store and assigned a collective label.

In some cases, messages may match multiple types of rules with a high confidence. As one example, suppose in an analysis of 10,000 initial lines from a blade, 90% are determined to be Apache access log data, and the remaining 10% are determined to be NTP data. This situation might arise if the device from which the blade is extracting data is an Apache web server that is configured to provide its logs to syslog (as is NTP). In this scenario, the administrator of the blade could be notified of the different types of data appearing in the syslog and be given the opportunity to have those two types of data individually tagged (e.g., with an "Apache" tag and an "ntp" tag). Further, the notice alone would alert the administrator that perhaps the logging on the device itself is misconfigured.

In some cases, none of the confidence measures determined at 1206 will exceed the threshold needed to classify the received message data (e.g., as being Apache access log data). One reason this could happen is that, as explained above, the data may be associated with a new application for which no parser rules/schema exist in library 942. As explained above, approaches such as extracting tokens from the raw data, and applying all parser rules to the data can be used to extract structure from the raw data and store it in structured store 918. In some embodiments, the data is not stored in the structured store (e.g., because storing the data in the raw store is sufficient for the data owner's purposes). Further, in some embodiments, if no appropriate parser is determined for the raw data, the data is assigned a source type of "undefined" (or other appropriate label). Periodically, such data can be reevaluated against the rules in library 942 so that, in the event new or updated parser rules are added that are a good fit for the data, the owner of the data can be alerted and offered the opportunity to begin parsing data using the applicable rules (and/or to reparse the previously received raw data for inclusion in structured store 918). In various embodiments, platform 102 is configured to generate a parser applicable to the raw data.

Automatic Parser Generation

FIG. 13A illustrates a subset of entries in a log file. Suppose the log data shown in FIG. 13A (along with several thousand additional lines) is received (e.g., at 1202 in the process shown in FIG. 12) and, after portions 1204 and 1206 of the process shown in FIG. 12 have been performed, none of the rules in library 942 are determined to be a match (e.g., because all of the confidence measures are low). In some embodiments, one or more parser rules are generated using the raw data according to the following techniques.

Figure 14:
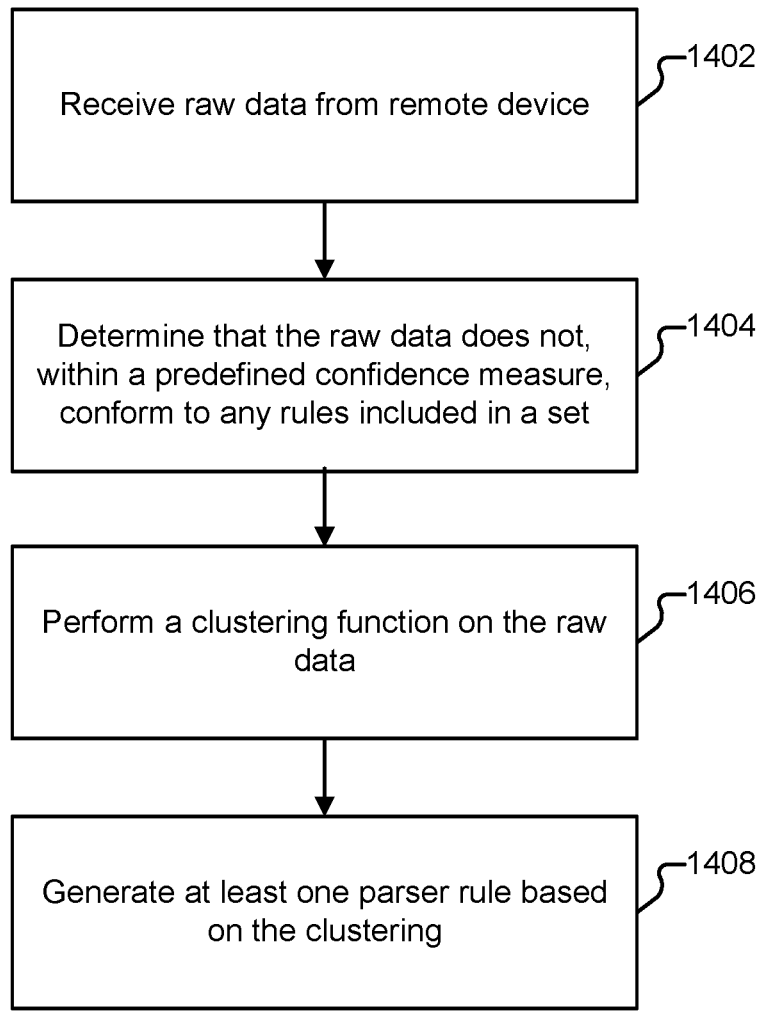
FIG. 14 illustrates an embodiment of a process for automatically generating a parser.

FIG. 14 illustrates an embodiment of a process for automatically generating a parser. In some embodiments, the process shown in FIG. 14 is performed by platform 102. The process begins at 1402 when raw data is received from a remote source. In some embodiments portion 1402 of the process shown in FIG. 14 corresponds to portion 1202 of the process shown in FIG. 12. At 1404, a determination is made that the raw data does not conform to any rules included in a set, such as the rules included in library 942. As one example, at 1404, the confidence measures determined at 1206 are evaluated and a conclusion is reached that none of the measures exceeds a threshold.

At 1406, the raw data is clustered using an appropriate clustering technique. The data shown in FIG. 13A could be clustered into one (or a few) clusters, depending on the clustering technique employed. When thousands of lines are considered, several clusters might emerge. For each cluster, a determination is made of which values in each line are variable across the cluster, and which remain constant, as well as boundary information. As one example, in the data shown in FIG. 13A, "Port" (1302) is present in all five lines, as is "STP State" (1304), while the data in column 1306 changes (e.g., is the value 2, 4, 6, or 16). Other values (e.g., "Oct 27") which appear to be constant based on the lines shown in FIG. 13A would (after evaluating a sufficient number of lines) be determined to change.

Regular expressions that match the analyzed clusters can then be automatically generated and structure inferred, such as the number and size of columns. Using the lines shown in FIG. 13A, a sample regular expression that would match all of the lines is shown in FIG. 13B. The regular expression shown in FIG. 13B is an example of a parser rule (1406). Other rules applicable to other lines of the log (not shown) could also be generated to form a set of parser rules for the blade from which the raw data is received (e.g., at 1402).

As explained above, library 942 includes various token definitions for entries such as IP addresses and email addresses. In some embodiments, in addition to generating a set of parser rules for the data received at 1402, labels for at least some of the columns are automatically selected (e.g., using the token definitions). Using the example shown in FIG. 13A, tokenization could be used to identify the first portion of each line as being a date, and a time, respectively, or an absolute time, collectively.

In various embodiments, the parser rule(s) generated at 1408 (and any associated column labels) are presented to a human for review. The human may be an agent/employee of platform 102, but may also be an administrator of the blade from which the raw data used to form the rules/labels was received (i.e., at 1402). Errors may be present in the automatically generated rule(s), and the column labels may be incorrect or incomplete. As one example, the regular expression shown in FIG. 13B indicates that "Host123" is static information. An administrator of the blade might recognize that "Host123" is a "hostname" (thus supplying a label that was not able to be determined by platform 102) and also indicate that instead of being represented in the rule as "Host123" it should instead be represented as "\a+," so that the rule can be generalized for use with other hosts (including hosts of other customers).

The rules/labels can be confirmed, or modified as applicable, and then saved for future use, such as by being included in library 942. The administrator of the blade can also be asked to provide additional contextual information. As one example, a dialog can be presented to the administrator that says, "We've detected that you're sending us data from a new kind of log. Please help us improve our tools by identifying the source of the data." Information provided by the administrator can be used to associate a source type (and/or source vendor and version) with the generated parser rule(s)/labels.

As explained above, customers can leverage tools provided to library 942 by other customers. Thus, if a second customer has a blade that transmits message data that is sufficiently similar to the data shown in FIG. 13A, the generated parser(s)/labels can be automatically selected for use by platform 102 and/or can be recommended to the second customer. A source type for the second customer's blade can similarly be recommended based on information provided by the first customer. The second customer can also be presented with the selected rule(s) and labels and given the opportunity to modify them as necessary. For example, the second customer may notice that the rule does not cover all of the applicable states (e.g., listening, disabled, learning).

Log Data Analysis—"Summarization"

Figure 15:
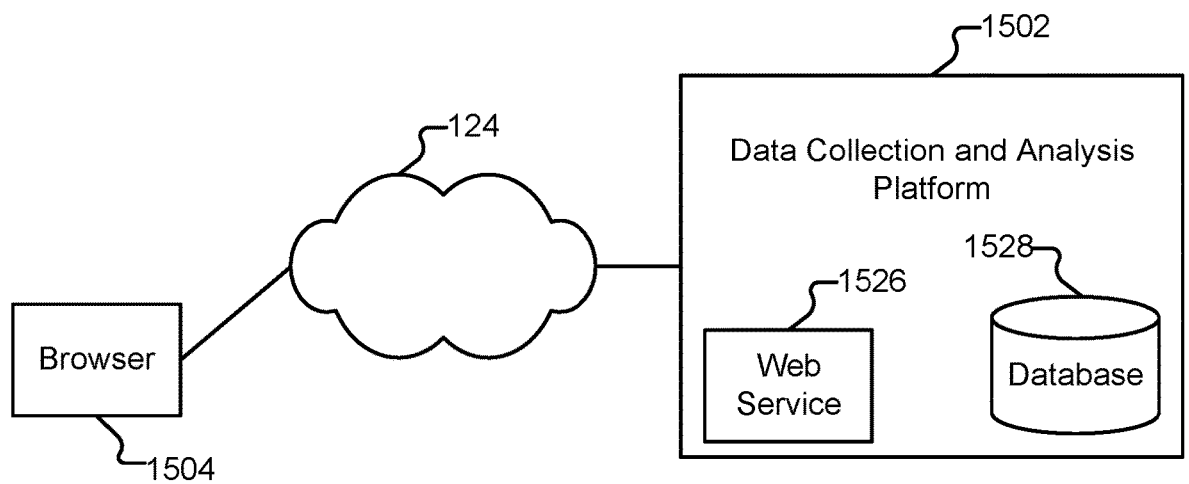
FIG. 15 illustrates an environment in which log data is collected and analyzed.

FIG. 15 illustrates an environment in which log data is collected and analyzed. In the example shown, platform 1502 is an embodiment of platform 102. As shown, a user of browser 1504, such as Alice, can access platform 1502 via a web service 1526. Web service 1526 is an embodiment of web service 126. As will be described in more detail below, various data manipulation and visualization tools are made available via platform 1502.

FIG. 16A illustrates a subset of entries in a log file. The log file has thousands of entries and its contents are periodically sent (e.g., by a collector) to platform 1502. As will be discussed in more detail below, lines 1602-1608 were inserted into the log by a C program, a portion of which is shown in FIG. 16B. In particular, lines 1602-1608 were inserted by the print statement on line 1652.

Suppose the data shown in FIG. 16A pertains to a disk controller located in Acme Company's network. The disk controller has an associated collector called "disk-controllerA-collector." Alice believes the disk controller may be malfunctioning. She would like to view the logs associated with the controller as part of her investigation, but is daunted by the prospect of reviewing thousands of lines of logs (or more).

Figure 17:
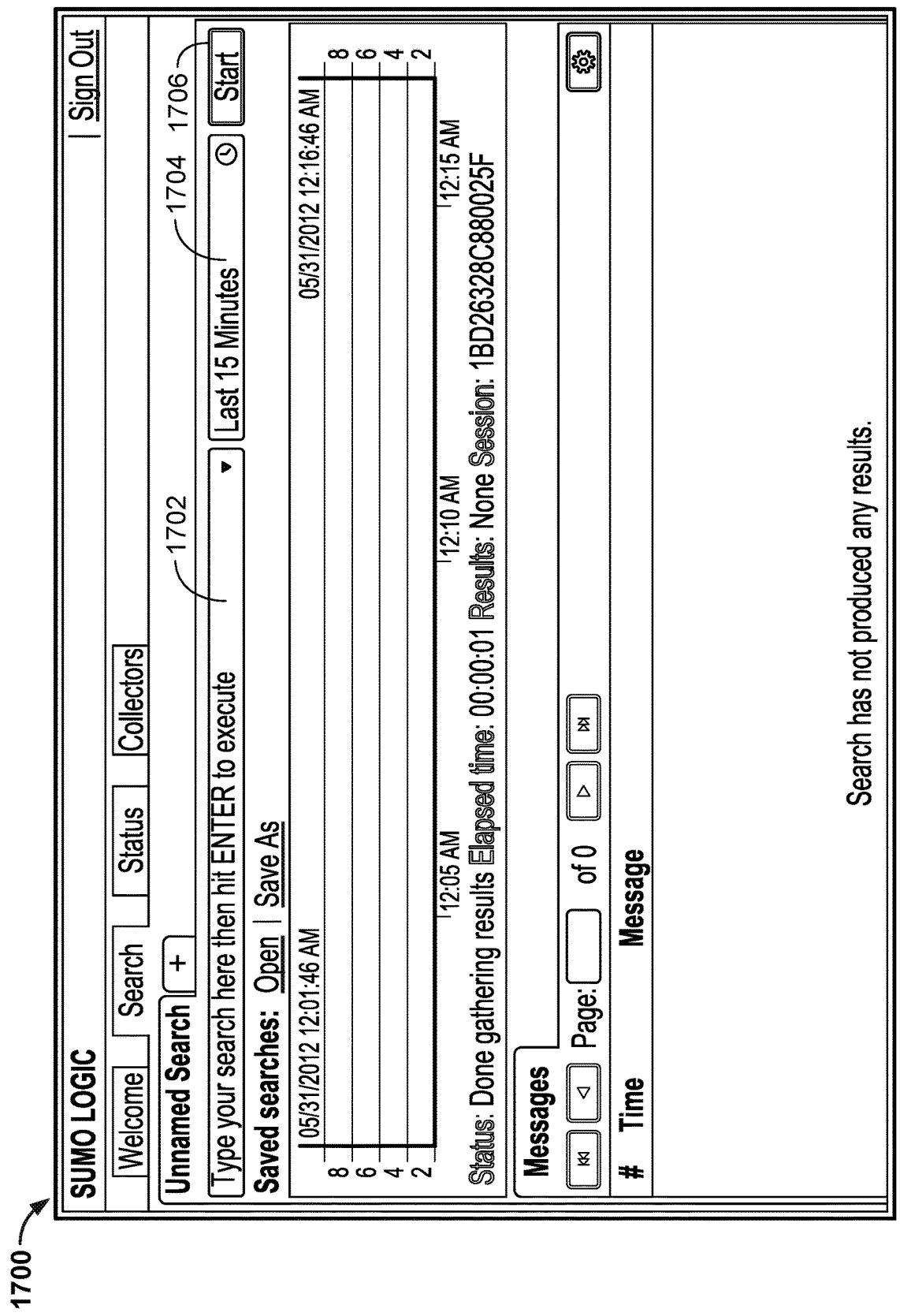
FIG. 17 illustrates an embodiment of an interface as rendered in a browser.

Alice visits platform 1502 using browser 1504, logs in to her account (as an Acme Company administrator), and is presented with interface 1700 shown in FIG. 17. She can perform queries on Acme's data by submitting them in box 1702. As one example, Alice could enter the name of the collector "disk-controllerA-collector" into box 1702. She can specify a time range for the log entries she would like to view by selecting an appropriate range (e.g., "last fifteen minutes," "yesterday," "this week," "Oct 10 midnight through Oct 12 noon") via dropdown 1704.

Figure 18:
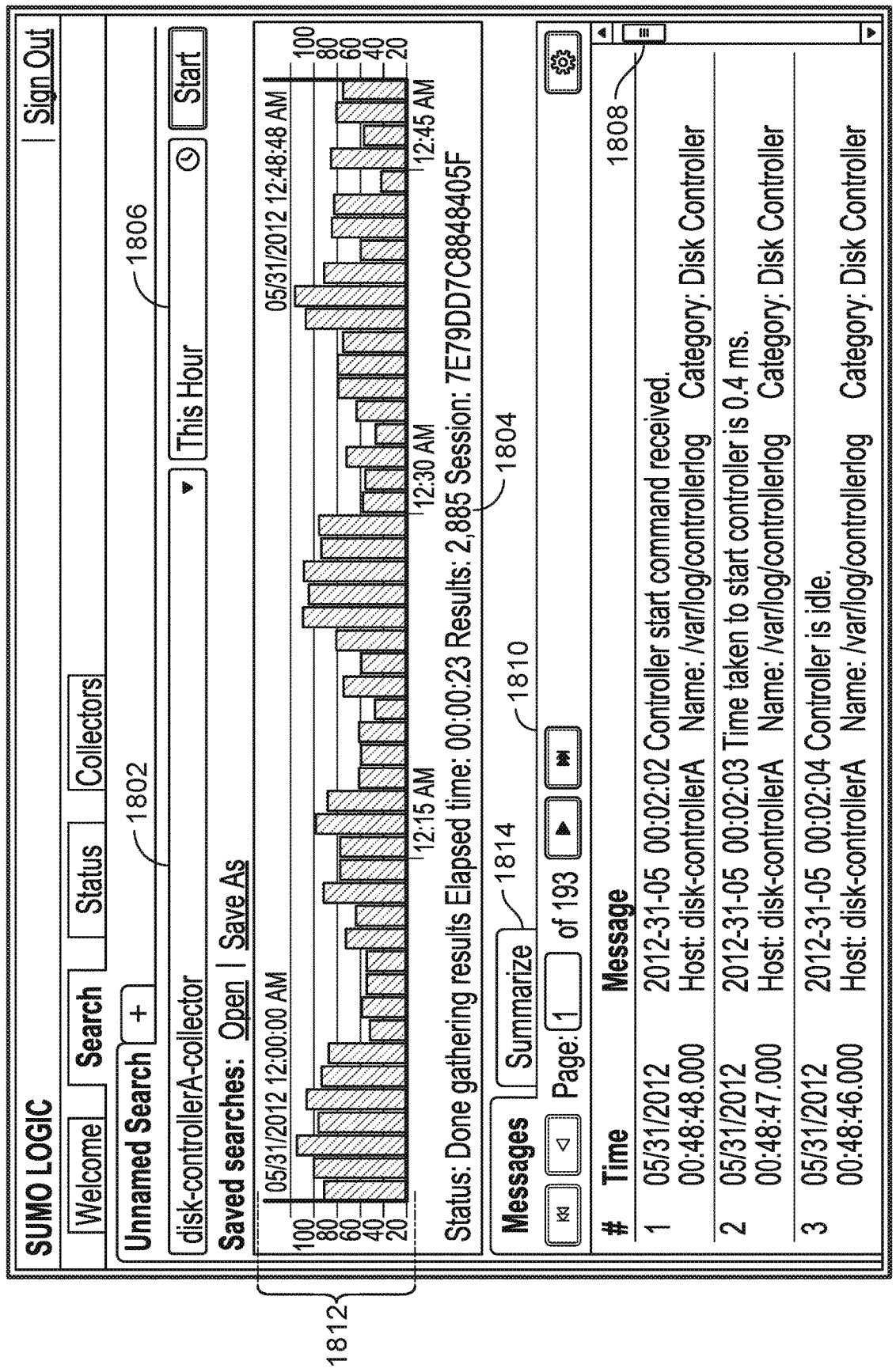
FIG. 18 illustrates an embodiment of an interface as rendered in a browser.

FIG. 18 illustrates interface 1700 after Alice has entered a query term into box 1702 (1802) and selected start button 1706. As indicated in region 1804, a total of 2,885 individual messages (e.g., log lines) pertaining to the disk controller collector were generated in the time frame selected by Alice (1806). A graph depicting when, over the time frame, the messages were generated is shown in region 1812.

Alice could manually review each of the messages by interacting with scroll bar 1808 and controls 1810. However, doing so could potentially take Alice hours of time. Further, Alice may inadvertently miss important or otherwise interesting messages due to the sheer volume of messages she is reviewing, the bulk of which may be uninteresting.

Figure 19:
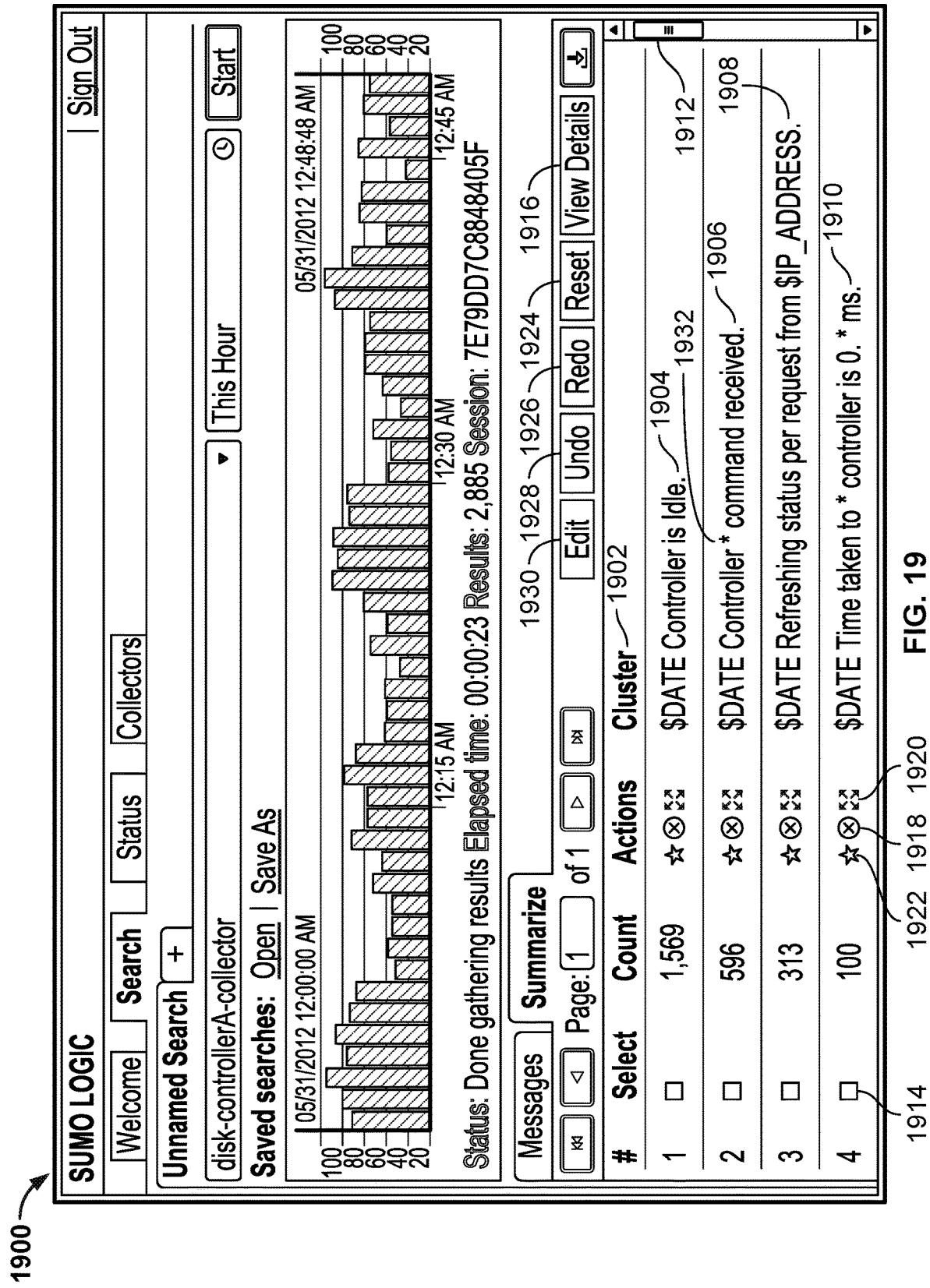
FIG. 19 illustrates an embodiment of an interface as rendered in a browser.

If Alice clicks on "Summarize" tab 1814, she will be presented with interface 1900, shown in FIG. 19. The Summarize view groups messages by content similarity into clusters. In particular, messages with similar structures and common repeated text strings are grouped. The clusters in the summary view are dynamically generated. For example, if Alice selects a longer or shorter time range, includes multiple collectors in her query term, etc., the clustering results will change.

Cluster column 1902 displays a "signature" for each cluster. The content of each message in a given cluster conforms to the signature. Within a given cluster signature, fields that vary (and, in the example shown, are not tokenized) are displayed with wild card placeholders (e.g., "*") while tokenized fields such as timestamps and IP addresses are replaced with appropriate placeholder variables (e.g., "$DATE" and "$IP_ADDRESS", respectively). As will be described in more detail below, Alice can modify the signatures so that a given static or tokenized field becomes more generalized (e.g., by changing "Controller" to "*", or "0.*" to "%double") and/or so that generalized fields become more specific (e.g., by changing "$IP_ADDRESS" to a specific IP address).

As indicated in line 1904, a total of 1,569 messages in the log for the specified time frame are "controller is idle" messages. As indicated in line 1906, a total of 596 messages collectively indicate that the controller has received some type of command. As indicated in line 1908, a total of 313 messages collectively indicate a status request was received from a variety of hosts. Finally, as indicated in line 1910, a total of 100 messages collectively indicate a time taken by the controller to perform an action, in milliseconds. Additional messages (e.g., in clusters of size smaller than 100) can be viewed by operating scroll bar 1912. Messages that are not readily grouped into clusters are separated into a distinct cluster called "Others." The "Others" cluster might contain simple miscellaneous messages that are not important, or it might include anomalous messages that are meaningful. To investigate, Alice could locate the "Others" cluster (e.g., by scrolling down) and "zoom in."

Figure 20:
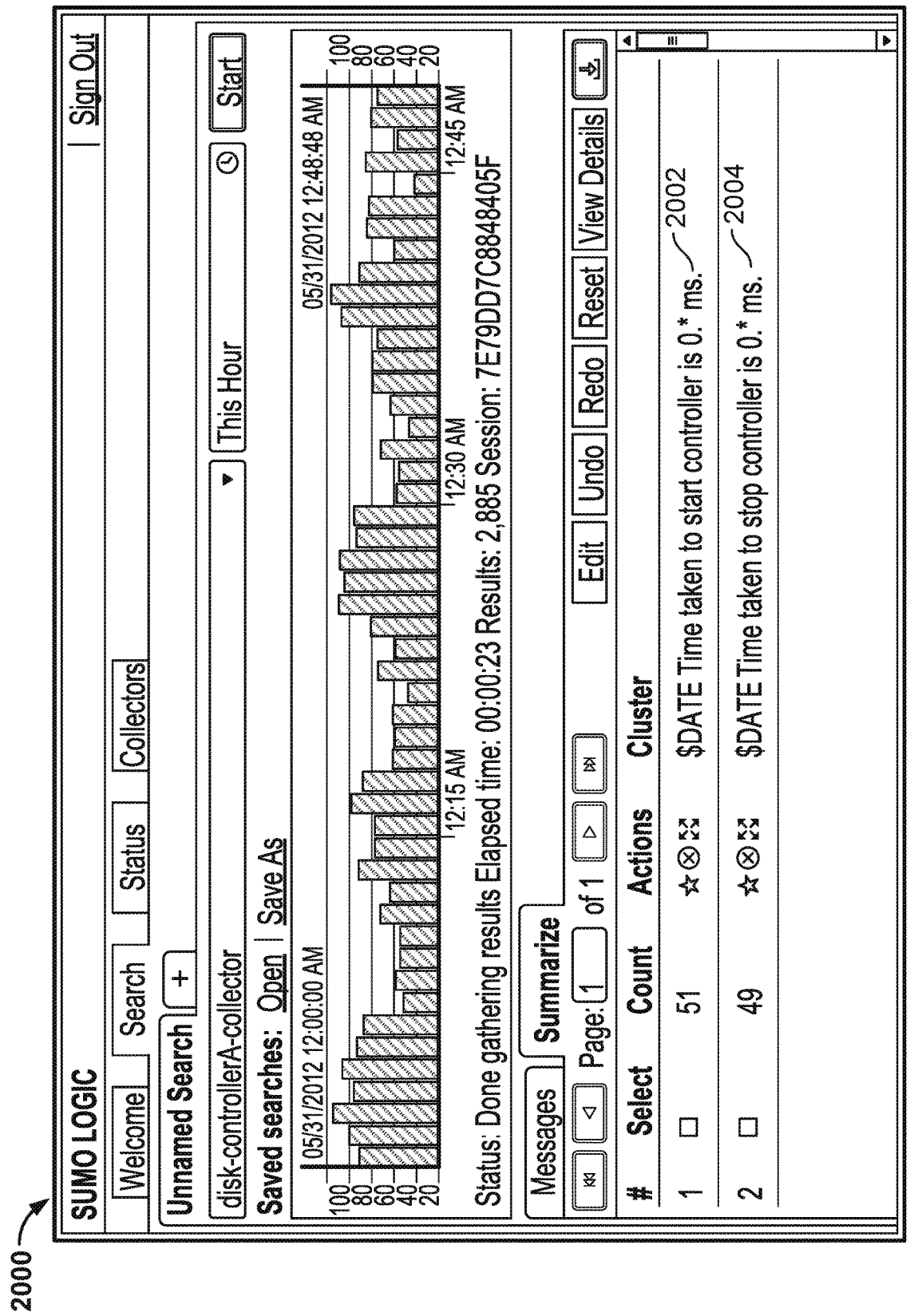
FIG. 20 illustrates an embodiment of an interface as rendered in a browser.

Alice can "zoom in" on a given cluster and show its sub-clusters (if applicable) by clicking the appropriate box in the "Select" column (e.g., select button 1914) and clicking "View Details" button 1916. Interface 2000, shown in FIG. 20, depicts interface 1900 after Alice has elected to zoom in on line 1910. Lines 2002 and 2004 illustrate that the "Time taken to * controller" messages appear in two forms in the log—time taken to "start" (2002) and time taken to "stop" (2004).

Alice can also take other actions with respect to the clusters shown in interfaces 1900 and 2000. For example, she can hide a given cluster by clicking icon 1918, causing it to disappear from the results list. In some embodiments, clusters (and/or signatures) are hierarchical in nature. As one example, the signature shown in line 1910 can be considered a parent of the signatures shown in lines 2002 and 2004, which are leaves. Alice can break a single cluster into multiple clusters (i.e., cause a parent cluster to be broken into children) by clicking icon 1920, if applicable. As one example, Alice could break the cluster indicated in line 1910 into the two sub-clusters indicated on lines 2002 and 2004 by clicking icon 1920. If a cluster cannot be broken further (e.g., leaf cluster 2002), icon 1920 will be greyed out. Alice can mark a cluster (i.e., signature) as important by clicking on icon 1922. If Alice re-runs a query (e.g., with a different time range or additional parameters), any clusters marked as "important" will remain as separate clusters, irrespective of whether a clustering operation run against the results of the new query would have yielded that cluster. Alice can undo (1928) and redo (1926) actions, and can also reset any preferences (e.g., showing previously hidden clusters) by clicking button 1924.

In some cases, Alice may want to edit the signature of a cluster. For example, if the signature shown in line 1910 was not present in the interface shown in FIG. 19 and instead the signatures of lines 2002 and 2004 were, Alice could edit one of the signatures (or create a new parent signature) that generalized the "stop" and "start" portions of the signatures into a "*" or other appropriate generalization. Various additional examples of signature editing are as follows:

Incomplete field: As previously explained, lines 1602-1608 were generated by a C program, a portion of which is depicted in FIG. 16B. Line 1652 of the program inserts into the log the time, in milliseconds, taken to start or stop the controller. Each of the time values present in lines 1602-1608 is less than a millisecond, and thus is prefaced with "0.". The signature depicted in line 1910 treats the "0." as static text. Suppose that upon reviewing the signature, Alice determines that "0.*" should be generalized to "*". She may have written the program shown in FIG. 16B and thus have domain knowledge about what the format should generalize to. It may also be the case that the correction needed would be evident to anyone viewing the data. For example, an individual might readily identify that a field corresponds to a sequence number (e.g., "38483749123") and that the entire value should be represented as a variable, rather than being partially represented by static information (e.g., "3848374*"). Alice can modify the signature accordingly by selecting line 1910 and clicking the edit button 1930, which will present her with an editable copy of the signature. In various embodiments, additional wildcards are available, such as ones allowing Alice to specify data types (e.g., integer vs. double). Alice's edits can be saved—whether for the rest of her query session, or more permanently (e.g., in database 1528 as JSON).

In some embodiments, Alice's edits are made available to other users of platform 1502. Examples include making the cluster signature available to other employees of Acme who might manipulate the same data (i.e., data from that particular collector) and employees of Acme who might manipulate similar data (e.g., data from other disk controllers). In some embodiments, the contents of database 1528 are made globally available (e.g., available to all users of platform 1502, irrespective of whether or not they work for Acme). In various embodiments, prior to a new signature being included in database 1528, the user whose data was used to generate the signature is prompted for permission. As one example, the data Alice is examining in interface 1900 may have a signature generated for it that is not currently stored in database 1528. Prior to the signature being included in database 1528, Alice may be asked to confirm that the signature does not contain any confidential information (e.g., internal IP addresses or employee identifiers) and/or may be asked to edit the signature to remove any confidential information present, as applicable. Alice can also be asked to provide a description of what the signature represents (e.g., as metadata) to be stored in database 1528. As one example, a given signature generated by platform 1502 (and/or refined by Alice) for an Apache log might represent a URL request. When Alice is prompted to add the signature to database 1528, she is asked to explain the nature of the line. In some embodiments, the signature label, rather than the signature itself, is displayed in interface 1900 (e.g., as a user customizable option).

Missed field: In some cases, such as where the time window specified by Alice via dropdown 1704 is small, text that is variable will erroneously be treated as if it is static. As one example, if Alice selected a shorter time period than what is shown, the messages corresponding to line 1908 might be generated with respect to a single IP address (e.g., 10.0.0.1), rather than multiple IP addresses. The signature generated might thus include that single IP address as a static field. Alice can modify the signature to transform the specific IP address into the variable, "$IP_ADDRESS" as needed.

Misunderstood field: Similar to the incomplete field example above, for some data in a message, such as a URL, portions of the data may erroneously be treated as fixed rather than variable. As one example, log entries that include permutations of "www.example.com/page123.html" might be erroneously generalized to "www.*.com/page.html" when "$URL" or "www.example.com/*" or some other generalization might be more appropriate. Alice can modify the fields in the signature as needed/desired. In various embodiments, Alice is able to assign labels to the fields (e.g., denoting an internal IP address vs. an external IP address). Fields can also be hierarchical, e.g., with "$EXTERNAL_IP" being a child of "$IP_ADDRESS".

Alice can also interact with other regions of interfaces 1900 and 2000. For example, in some embodiments, if Alice hovers her mouse over star 1932, a floating list of each of the values that is generalized by that star is shown. Alice can interact with the list, e.g., by hiding entries with certain values—designating values that should be used to split the cluster into separate clusters, etc. As one example, Alice could opt to hide messages matching the signature shown in line 1910 where the time is under 0.3 ms. As another example, Alice could opt to break the messages matching the signature shown in line 1906 into clusters corresponding to each of the specific actions subsumed by the wildcard.

Figure 21:
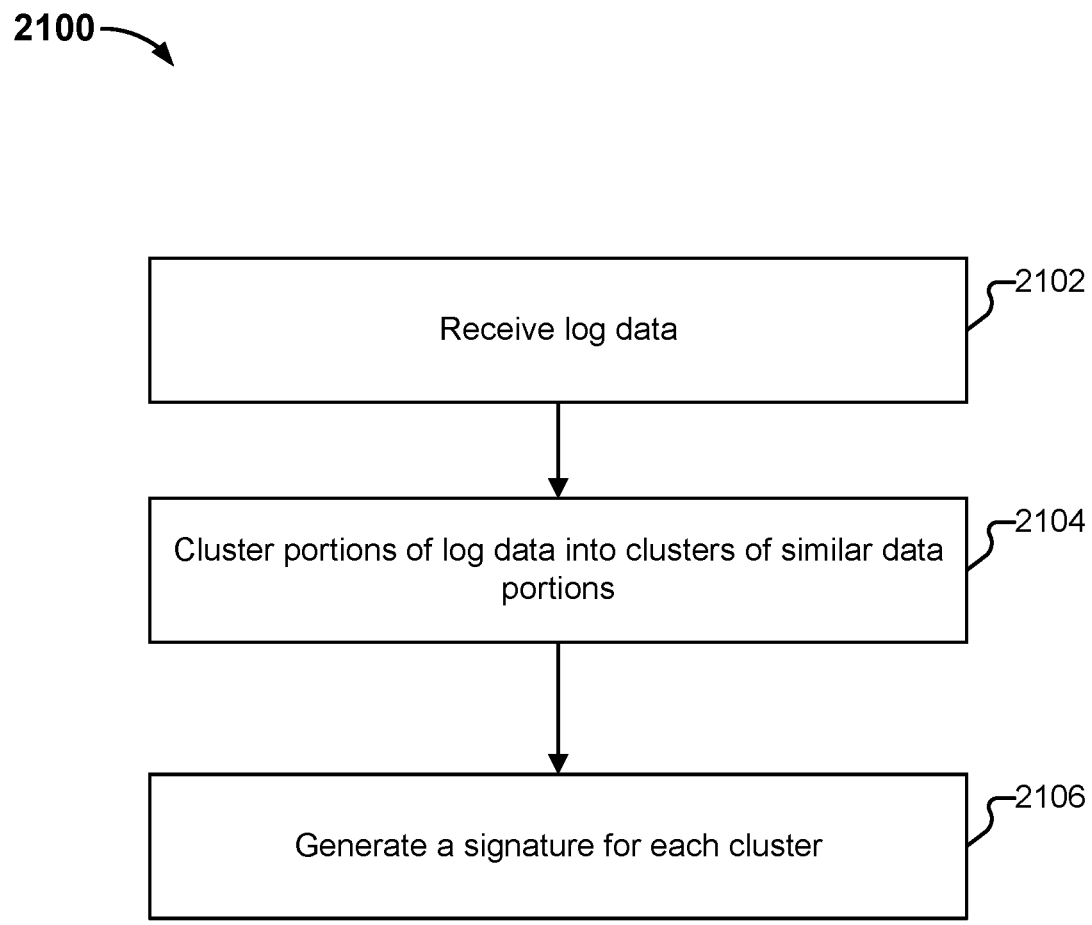
FIG. 21 illustrates an embodiment of a process for analyzing log data.

FIG. 21 illustrates an embodiment of a process for analyzing log data. In some embodiments, process 2100 is performed by platform 1502. The process begins at 2102 when log data is received. The log data can be received in a variety of ways. For example, it can be received as a real time stream (e.g., directly from a collector), it can be retrieved from a storage, and can also be received from multiple sources (e.g., multiple streams tagged with identifiers). Further, the received data can be refined through the use of one or more query terms (e.g., limiting the received data to just that data that includes a keyword, limiting the received data to a particular time frame, and/or any other applicable constraints). As one example, log data is received at 2102 when Alice clicks on "Summarize" tab 1814, indicating which data she wishes to be analyzed. In some embodiments, query results are always summarized, e.g., without Alice having to click on tab 1814.

At 2104, the received log data is clustered. A variety of approaches can be used to perform the clustering. As one example, the log data can be clustered using nearest neighbor. Another approach is to perform a hierarchical clustering using fuzzy matching. Matches with scores above a certain threshold (e.g., 95%) are deemed to belong to the same cluster. In some embodiments, the score represents a confidence that the lines were generated with the same print statement.

Finally, at 2106, a signature is generated for each cluster. One approach to generating a signature is to determine a print statement that could have generated each of the lines in the cluster. In particular, the static (constant) portions are determined and the non-static portions are generalized (e.g., using tokens and/or wild cards). Using lines 1602-1608 as an example, "Time taken to" aligns across all four lines and is treated as static (constant) information, as is "controller is." The portion in between (i.e., "start" or "stop") is generalized, e.g., to any of: the wild card "*", a text string, and a regular expression (e.g., [start,stop]), as appropriate. As shown at 1910 in FIG. 19, an example of a signature for lines 1602-1608 is "$DATE Time taken to*controller is 0.* ms".

In some embodiments, the log data operated on by process 2100 is already tokenized (e.g., as a result of at least a portion of process 1200 being performed on the data previously). A token library can also be used to automatically generalize fields in a given cluster as process 2100 is performed, such as email addresses, IP addresses, and date/time information. Rudimentary data types and other classifications such as "double," "int," and "Boolean" can also be used within the signature to offer additional granularity of generalization between the spectrum of fixed text (i.e., literal matches) and a "*" wildcard (i.e., matching everything).

In various embodiments, multiple iterations of portions 2104 and 2106 of process 2100 are performed, and/or portions 2104 and 2106 are performed in parallel. As one example, when Alice first begins her query session (e.g., when she encounters interface 1700 after logging in), the set of signatures associated with the session may be empty. As messages are received and processed, the set of signatures increases (e.g., with the first message being used to create a signature, and additional messages either matching the signature or forming the basis of new signatures, as applicable). As previously mentioned, signatures can also be stored (e.g., in database 1528) and used as a library instead of generating all signatures from scratch for each session. For example, a signature that matches the presence of a failed login attempt in a particular kind of log data may be of interest to virtually anyone reviewing that log data. Such a signature could be included in database 1528.

Single Click Delta Analysis

During investigation or recovery events, or when users (e.g., customers using data collection and analysis platform 1502 of FIG. 15), for example, wish to determine if the latest change in production (release, spike, etc.) had a negative impact, it may be challenging to identify relevant information in a large volume of data.

The techniques described above for analyzing log data include search (which can be used if the user knows what they are looking for) and summarize (which can be used to group, organize/rank-order the patterns). In some embodiments, aggregate functions may be used for extracting metrics from logs.

Described herein are techniques for single click delta analysis, which can be used to provide additional contextual information, such as, for example, identifying what has changed compared to a "similar" period in the past. Variance analysis between other groupings or aggregations of data may also be performed, as appropriate, where the groupings may be defined or divided based on a variety of characteristics or behaviors, such as different time ranges, different types of data to be compared, different systems to be compared, different subsets of users, nodes, etc. As will be described in further detail below, using the techniques described herein, a simple and intuitive way for users to access advanced analysis capabilities is provided. In some embodiments, the advanced analysis capabilities described herein include comparison of results of more than one (e.g., two or more) queries against each other (i.e., "delta analysis"). As will be described in further detail below, the queries that produce the results to be compared may differ in various manners, dimensions, characteristics, or behaviors, such as in a covered time range and/or the query itself. Using the techniques described herein, analysis of various data sources, such as log messages and metrics (e.g., natively generated telemetry data) may be performed.

As will be described herein, single click delta analysis for log messages may be provided in a variety of manners. As one example, the clustering described above may be leveraged to perform single click delta analysis. As another example, single click delta analysis may be performed by comparing logs that have been transformed into time series (i.e., synthesized from logs), for example, by overlaying different time ranges. In some embodiments, for natively generated metrics, overlaying time ranges may be generated for comparison. Single click delta analysis of log messages, metrics synthesized from log messages, and natively generated metrics will be described in further detail below.

In some embodiments, the components of the schema described herein can be performed in various contexts, such as: UI elements, selecting a type of analysis, etc. As described herein, a user can perform single-click delta analysis (e.g., analysis/comparison results between two different time periods (i.e., temporal delta)) based on most common behavior and cyclicality via a single click in a user interface (e.g., graphical user interface (GUI)). Single click delta analysis may also be performed between other groups of data, such as between two different clusters, systems, regions, nodes, etc., whose behavior may be modeled in ways other than cyclicality.

Figure 22:
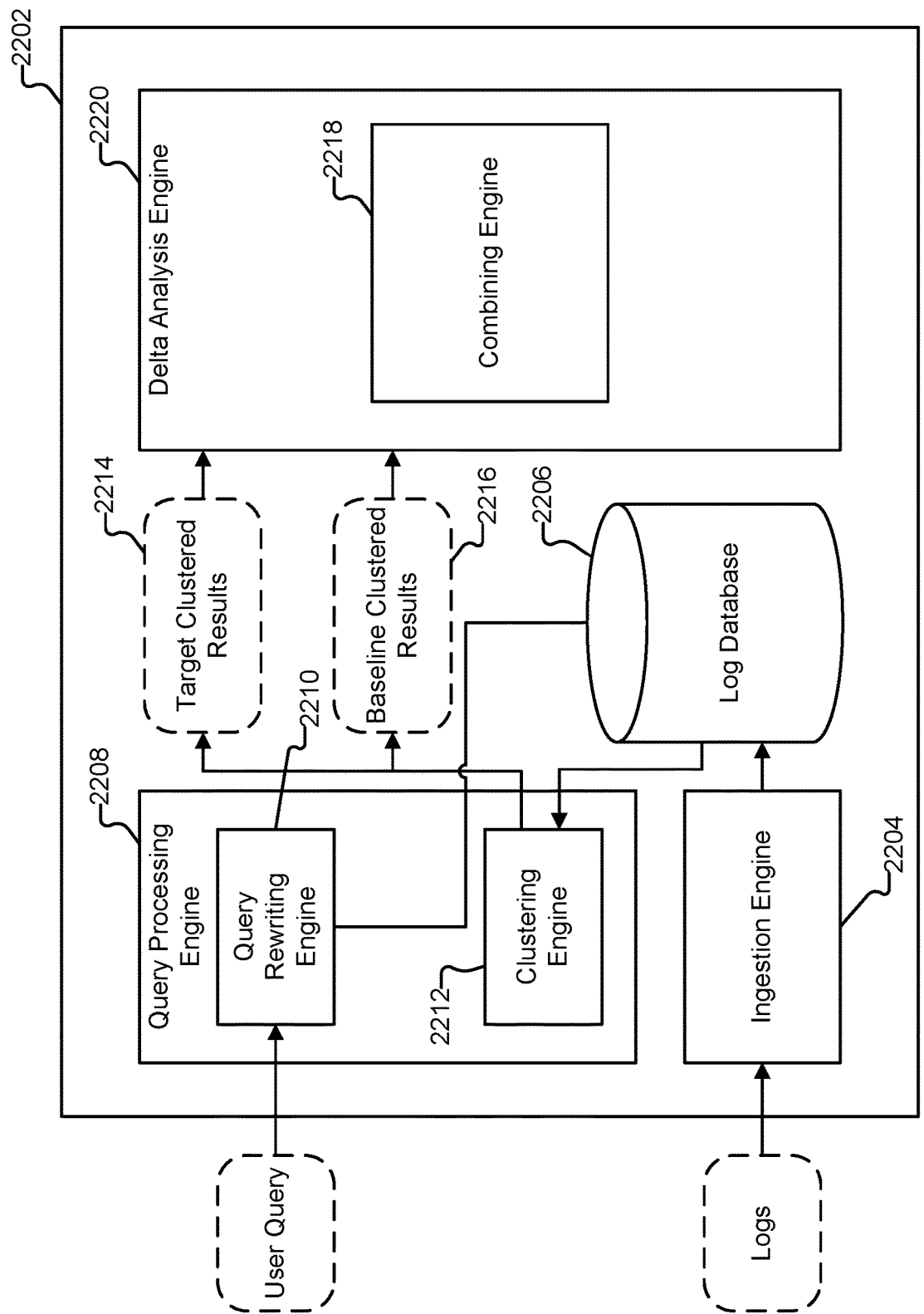
FIG. 22 illustrates an environment in which single click delta analysis is performed.

FIG. 22 illustrates an environment in which single click delta analysis is performed. In the example shown, platform 2202 is an embodiment of platform 102. While single click delta analysis of log data/messages is described in conjunction with the example environment of FIG. 22, the techniques described herein can variously be adapted to accommodate single click delta analysis of other types of data, as applicable, such as metrics synthesized from log messages/queries and natively generated metrics, which will be described in further detail below.

In the example shown, a user, such as Alice (e.g., using a browser), can access platform 2202 (e.g., via a web service) to perform queries/searches to surface interesting data and gain insights from log data ingested by platform 2202. In the example shown, log data (which may include log data collected, over a network, from blades and collectors, as described above) is ingested using ingestion engine 2204. The ingested log data, in this example, is stored to log database 2206.

In this example, suppose that Alice would like to see all messages for a given time range that contain the terms "error" and "exception" for a category of messages. Alice submits a search to platform 2202 with the query "error AND exception AND_sourcecategory=forge". The query is processed by query processing engine 2208, which in some embodiments, is an alternate view of query system 936.

Figure 23:
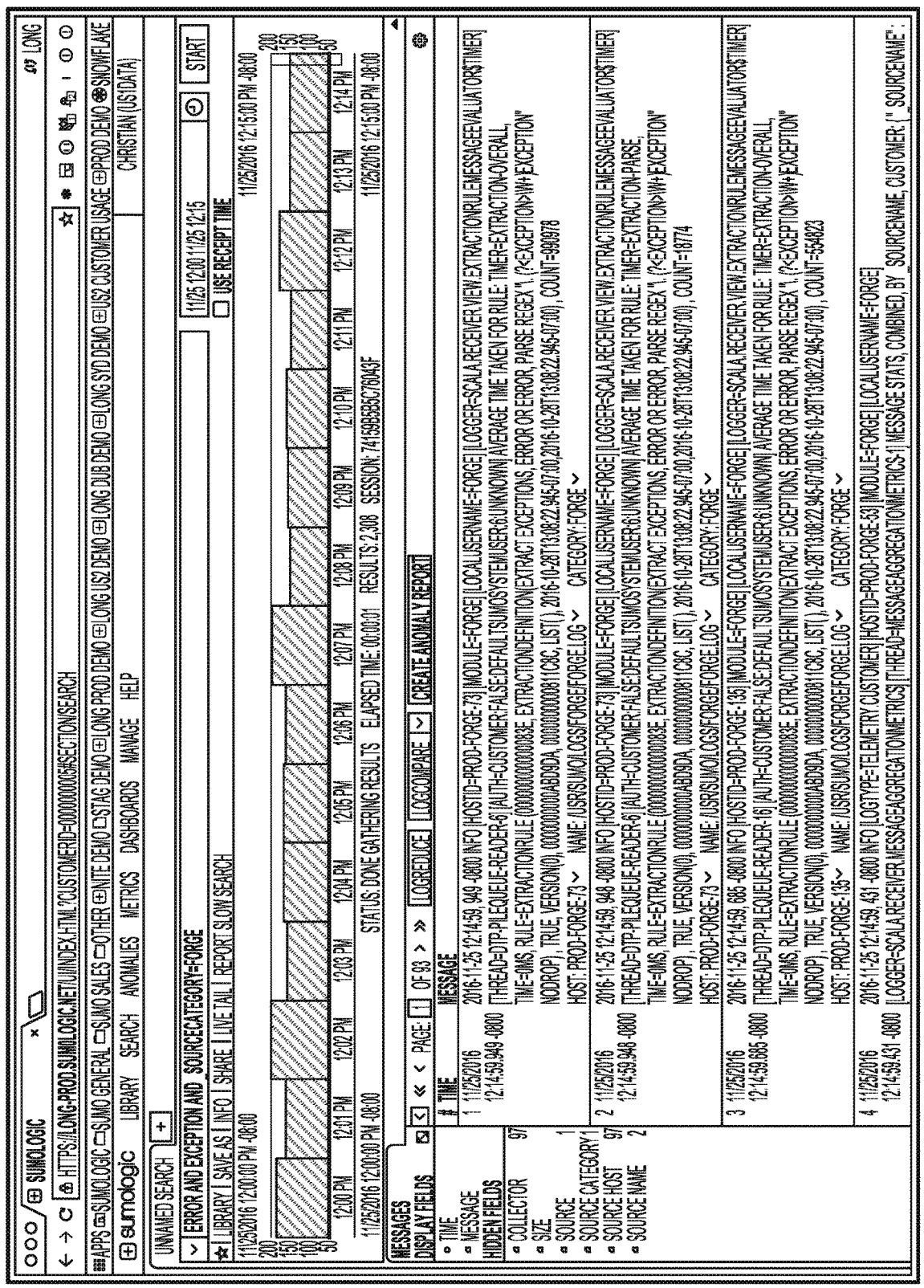
FIG. 23 illustrates an example embodiment of a user interface including query results.

Suppose that in this example, a time range of the last 15 minutes (e.g., 15 minute time range/window) was selected. For example, the most recent 15 minute time window may be selected by Alice or by default. Alice may also select any custom time range as desired (e.g., by specifying expressions for the start and end times). FIG. 23 illustrates an example embodiment of a user interface including query results. In some embodiments, the interface of FIG. 23 is provided by platform 2202. In the example shown, the search described above for log messages in just the last 15 minutes returns a large number of results that may be too many messages for Alice to reasonably have a good idea of what is really occurring in this time range.

In some embodiments, log reduction may be performed to cluster the log messages, using, for example, the summarization/clustering techniques described above. In some embodiments, the clustering/log reduction may be invoked by clicking a button in the user interface. In some embodiments, the button is a shortcut to add a clustering operator (e.g., "log reduce") to the query itself, which is now rewritten (e.g., by query rewriting engine 2210) to "error AND exception AND_sourcecategory=forge||log reduce".

The log messages may be clustered, in this embodiment, by clustering engine 2212 based on the inclusion of the "log reduce" operator (e.g., the operator is an indication to platform 2202 that clustering of the log messages that match the query are to be clustered). As described above, in some embodiments, the clustering engine clusters together messages that have been generated by a similar or same string output template in the original application code that produced the log messages. In some embodiments, as described above, the clustering is performed by identifying portions of log messages that stay the same (e.g., are static), as well as identifying portions of messages that change between messages. In some embodiments, the clustering engine operates as a classifier, inferring a class (also identified via a corresponding signature, as described above) for each log message (obtained from log database 2206 based on the submitted query). In some embodiments, once each log message in the search result is assigned an inferred class, the classes are displayed along with a corresponding count of the inferred class (count of the logs that have been assigned to the inferred class). This allows Alice to effectively aggregate data such as log messages that might otherwise appear to be random, allowing Alice to gain insights into the results of her query.

Figure 24:
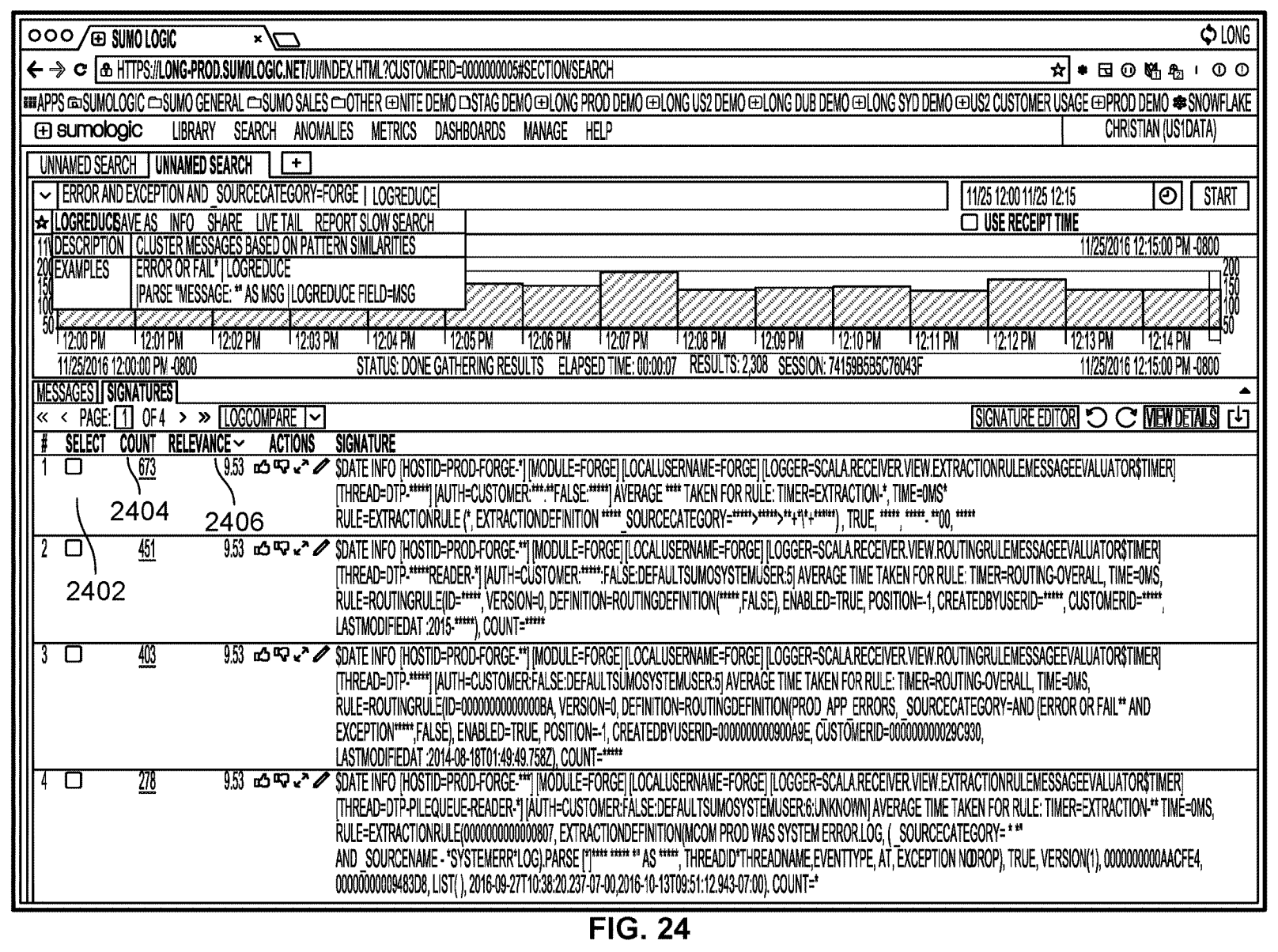
Figure 24:
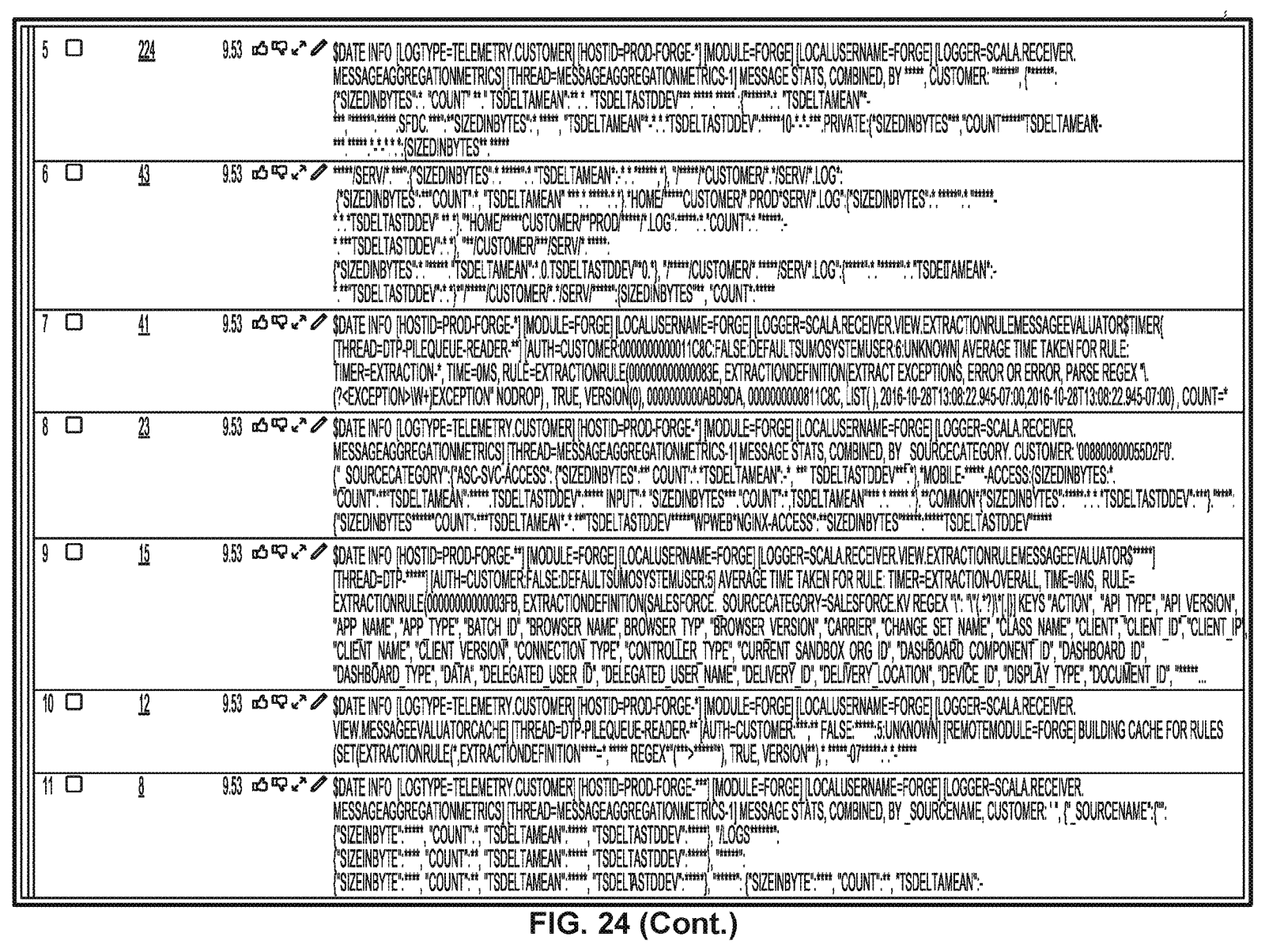

FIG. 24 illustrates an example embodiment of a user interface including clustered log message results. In some embodiments, the interface of FIG. 24 is provided by platform 2202. In this example, each row (e.g., row 2402) corresponds to a cluster (represented by a corresponding signature). In this example, for each cluster, a count of the number of messages that are included in the cluster is also displayed (2404). Also shown in this example are relevance scores (2406). In some embodiments, a relevance score is data that users such as Alice have applied to specific patterns (e.g., signatures or inferred message templates) in previous interactions with the data. The relevance score may be an implicit human enrichment of data that indicates that certain patterns may be more relevant than other to specific analysis.

Logs associated with human activity are likely to follow patterns, such as human cyclical patterns. For example, many logs may be indirectly or directly related to human behaviors, where weekly (day of week) and daily (hour of day) temporal patterns may be found in logs. Examples of such patterns include a spike in orders every weekday morning, increased traffic to a website during lunch, etc. Such patterns may exist for various customers (that subscribe to the capabilities provided by platform 2202) as well as various domains. Thus, users may find it useful if, with a single click, they are able to compare a result (e.g., activities and events) against a time window such as the day or the week before to determine, for example, what has happened, and how is what happened different from a previous time (e.g., when a problem was not present). As will be described in further detail below, such a determination may be based on a comparison of patterns, metrics, or logs currently as compared to a previous time.

In addition to classifying and counting the occurrence of the various classes/clusters of log messages in a search result, as described above, suppose that Alice would like to compare the results of her search against the results for the same search, but a different time range. Using the techniques described herein, such an analysis of the delta between what has happened previously with what is happening now may be performed (e.g., comparison of data in a target period against a baseline period).

In some embodiments, the user interface presented to Alice includes another button that allows comparison of logs. In this example, pressing the "log compare" button updates the query, adding a "log compare" operator. In this example, suppose that the previous time range of interest is 24 hours ago (i.e., Alice would like to compare data for the same 15 minute time window as before, but 24 hours earlier). The time range may be selected by default, from a list of presets, or customized (where a user can specify (e.g., in an expression) any baseline and compare it to the target time period). For purposes of illustration, the older time range is referred to as the baseline, and the more current time range is referred to as the target. A user may specify which results of which query should be designated as a baseline or target.

In response to clicking on the button, Alice's original query is rewritten by query rewriting engine 2210. In this example, the query is rewritten as follows "error AND exception AND_sourcecategory=forge||log compare timeshift-24 h". As shown in this example, in addition to query text, the query includes a "log compare" operator component and a "timeshift" operator component, which allow Alice to compare any result with a similar result in the past to efficiently, easily, and quickly identify what has changed in the log data.

In some embodiments, the addition of the "log compare" operator to the query is an indication to platform 2202 that comparison of two different groups of log messages are to be compared, with the groups of log messages divided based on time period (e.g., 24 hour difference). In response to the inclusion of the "log compare" operator and "timeshift" operator, the following example processing is performed. In this example, clustering, as described above, is executed twice for the same query "error AND exception AND sourcecategoryforge", one for the time range specified in the UI (referred to as the "target query"), and once for the same time range 24 hours prior (as specified by the "−24 h") (where this query for the older time period is referred to as the "baseline query"). For example, in response to the clicking of the button, two queries are generated, one for the original time range, and one for the same time range 24 hours prior. In some embodiments, the target query checks for variances against the baseline query, for a window time. The set of results from each of the generated queries for the shifted time ranges is then clustered (using clustering engine 2212), resulting in target clustered results set 2214 (corresponding, for example, to the results of the target query for the last 15 minute range of time), and baseline clustered results set 2216 (corresponding, for example, to the request of the query for the same 15 minute period, 24 hours ago). In some embodiments, the results comprise table data structures, with counts of the number of log messages included in each of the inferred classes/clusters (represented by corresponding signatures).

Delta analysis may then be performed on the generated sets of results. In some embodiments, the generated results are correlated or combined using combining engine 2218. The combined or correlated results may then be analyzed by delta analysis engine 2220 to determine deltas between the results. In some embodiments, the results of the delta analysis show the variance in signatures, giving users such as Alice insight into shifts in patterns (e.g., log message patterns, represented by corresponding signatures) over time. As shown in this example, when performing comparisons of log data, Alice need not write several, different, complex queries for different time ranges in order to perform a comparison. Instead, by surfacing, for example, a button, which when selected by Alice, performs the query rewriting, correlation/combining, and delta analysis described above, efficient comparison of collected information is provided. Use and leveraging of computing resources is also made more efficient, as more queries and processing may be run per unit time (e.g., allowing for parallel processing of queries and processing of query results), rather than waiting on the user, for example, to write a query, save the output of the query, and then run the query again over another time range. Thus, querying and comparison of data is made more efficient. Further details regarding delta analysis will be described below.

Figure 25:
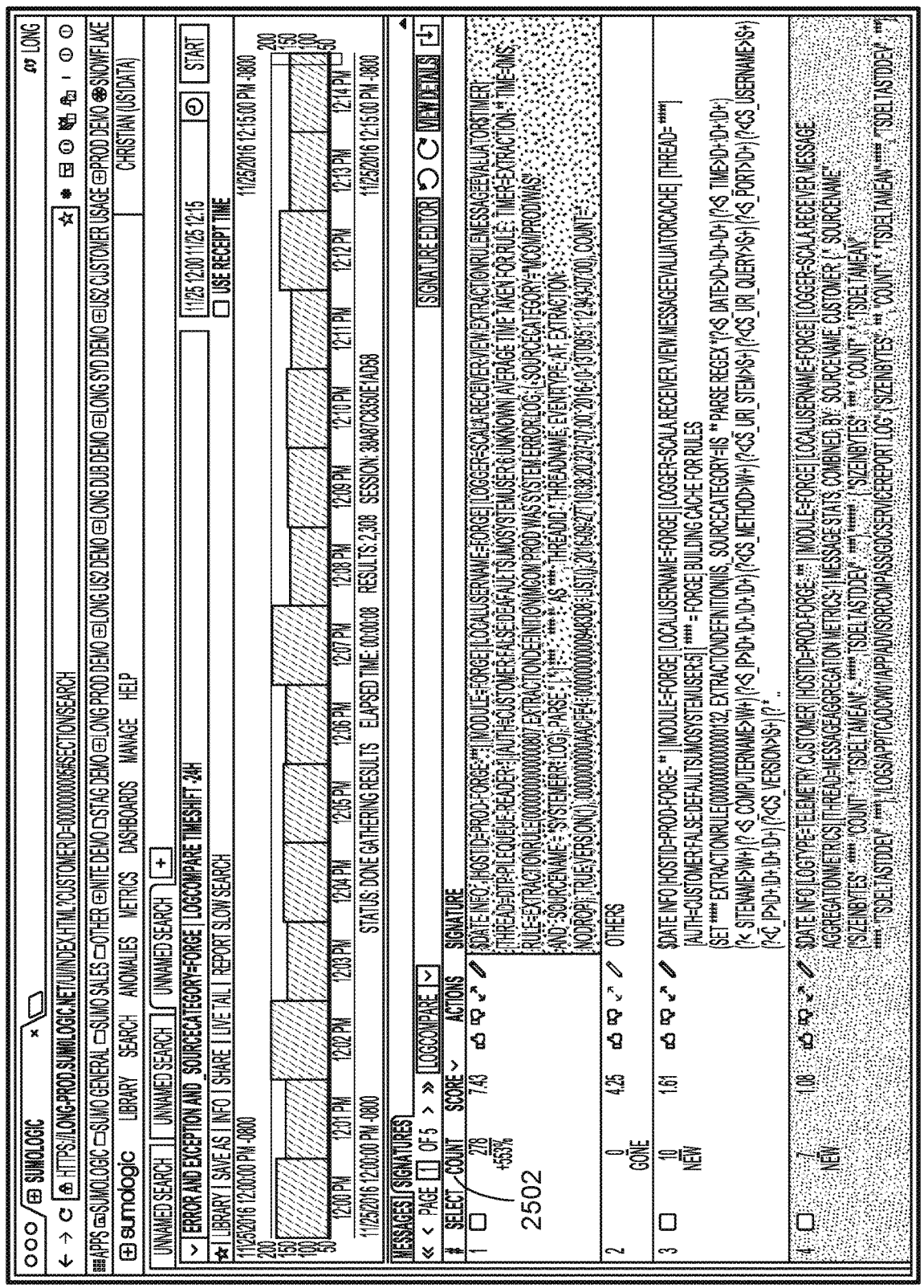
FIG. 25 illustrates an example embodiment of a user interface including a delta display.

FIG. 25 illustrates an example embodiment of a user interface including a delta display. In some embodiments, the interface of FIG. 25 is provided by platform 2202. In the resulting delta display of FIG. 25 (where the results of the delta analysis are generated, in some embodiments, by delta analysis engine 2220), in addition to inferred classes being shown, an indication of a change in cardinality of the inferred classes/clusters between the two time ranges is also shown. In some embodiments, a pattern difference score (2502) is also computed and displayed. In some embodiments, the score is a measure of how different a specific pattern (signature) is, as compared to what was seen in a baseline. For example, if one row (signature) differs from another (e.g., a signature in the baseline), but only by 1%, the corresponding score would be low. When a new log line appears or has a large difference (e.g., 1000%), then the score will likely be high. In some embodiments, the score displayed to a user is an indicator of a difference between a particular pattern and what was seen in a baseline.

As one example of combining and correlating results and performing delta analysis, suppose that for each of the generated target and baseline queries (generated by rewriting Alice's original query), the clustering engine returns the following target clustered results and baseline clustered results:

TABLE 1

| Class   | Count |
|---------|-------|
| Class 1 | 10    |
| Class 2 | 400   |
| Class 3 | 40    |

Table 1 includes a set of clustered target results (e.g., for the last 15 minutes). In some embodiments, table 1 is an example of target clustered results 2214. In this example, the table data structure of results includes two columns, one for the classes that are inferred, and another column for the count of the number of log messages in each class/cluster. In this example, three classes/clusters (with different signatures) of log messages have been inferred from the log messages matching to the query and the target time range. In some embodiments, a class is identified by a signature generated for the signature using the techniques described above.

TABLE 2

| Class   | Count |
|---------|-------|
| Class 1 | 1000  |
| Class 3 | 410   |
| Class 4 | 100   |
| Class 5 | 1     |

Table 2 includes a set of clustered baseline results (e.g., results for the earlier/older time range 24 hours ago specified in the user interface). In some embodiments, table 2 is an example of baseline clustered results 2216. In this example, the table data structure of results also includes two columns (same as in Table 1, as the same query was submitted, but for log data in a different time range), one for the classes that are inferred, and another column for the count of the number of log messages in each class/cluster. In this example, four classes/clusters of log messages have been inferred.

Delta analysis engine 2220 is configured to determine a delta or variance between the two generated sets of results shown in Tables 1 and 2. In some embodiments, performing the delta analysis includes combining or correlating the target and baseline results using combining engine 2218. For example, if the query results have joinable key columns, then the deltas between the value columns may be computed, visualized, or otherwise determined to provide insights. For example, key columns may be correlated in such a way that differences or variances in the values in value columns may be determined. In this example, the combining engine combines the two tables by performing a join on the classes between the tables (e.g., where the table have the same number of columns and include key and value columns, and where the tables are joined or combined or correlated on the primary key columns of class/cluster/signature). With the tables correlated on the key column of class name, the values in the value columns ("count" column in this example) may be analyzed to determine a variance between the values in the target set of results and the results returned from the baseline query.

For example, based on the combined, joined results generated by combining engine 2218, various delta metrics may be computed between the target and baseline results, relative to the baseline (e.g., to determine whether the count for a signature is higher or lower in the results for the target query relative to the results of the baseline query). As another example, if an inferred class is present in one set of results but not the other, an indication may be generated that indicates whether the class is new or gone (e.g., relative to the baseline). For example, if a class (identified by its corresponding signature) is present in the target results, but not in the baseline results, then the class may be indicated or designated as being new (relative to the baseline). If the class is present in the baseline results but not in the target results, then the class may be indicated as being gone (relative to the baseline). In some embodiments, if a class is present in both the target and the baseline results, then the difference in count for the class for the two time ranges is determined. A percentage change may also be determined between the target and the baseline (relative to the baseline).

Table 3 is an example of delta analysis results generated by delta analysis engine 2220.

TABLE 3

| Class | Time Range 1 | Time Range 2 | Delta | Label |
|---|---|---|---|---|
| Class 1 | 10 | 1000 | −990 | −99% |
| Class 2 | 400 | 0 | 400 | New |
| Class 3 | 30 | 410 | −380 | −92% |
| Class 4 | 0 | 100 | −100 | Gone |
| Class 5 | 0 | 1 | −1 | Gone |

By using table 3 (which may be displayed or presented in a user interface), Alice may determine that log messages of class 2 are completely "new," having not happened 24 hours earlier (baseline). Also, Alice may now determine that log messages of classes 4 and 5 have disappeared. Alice may use this information, for example, to determine the root cause of problems, or to better understand changes in behavior in complex systems.

Another example context in which the delta analysis described herein may be used is to find out how the behavior of a system has changed after a code rollout. Alice may simply invoke "Log Compare" after rollout of the code, with a time before the rollout to compare against. When Alice presses the "Log Compare" button, in some embodiments, a default time shift, such as 24 hours, or one day prior, is selected.

Alice may also specify other time shifts. FIG. 26 illustrates an example of a user interface for changing time ranges/shifts. In some embodiments, interface 2600 is provided by platform 2202. In the example shown, at 2602, Alice may click on the down arrow to reveal a dropdown menu that has an additional preset time range. The menu also includes an option for full customization of the log comparison behavior.

Figure 27:
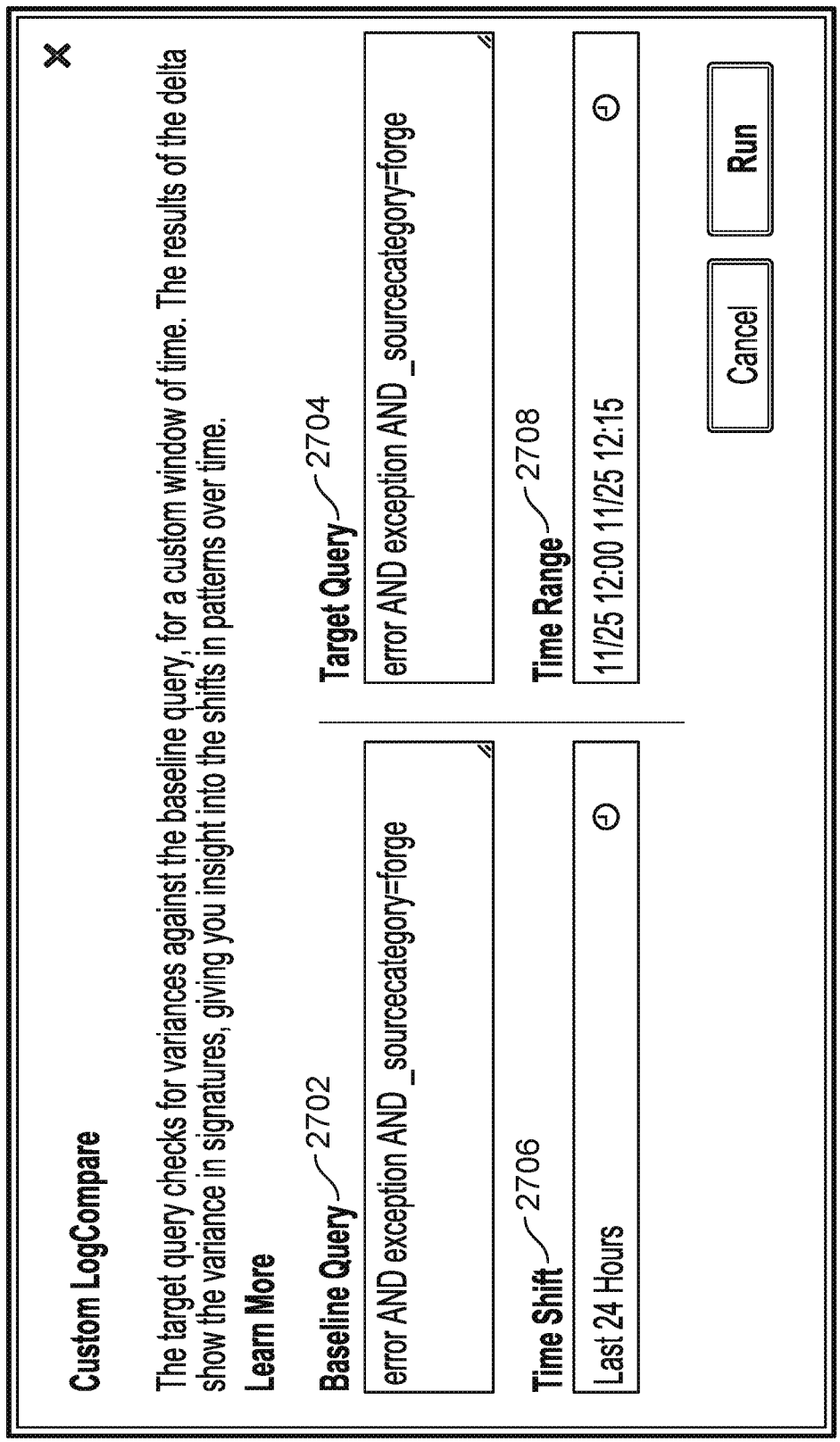
FIG. 27 is an example embodiment of a user interface for customizing log comparison.
Figure 28A:
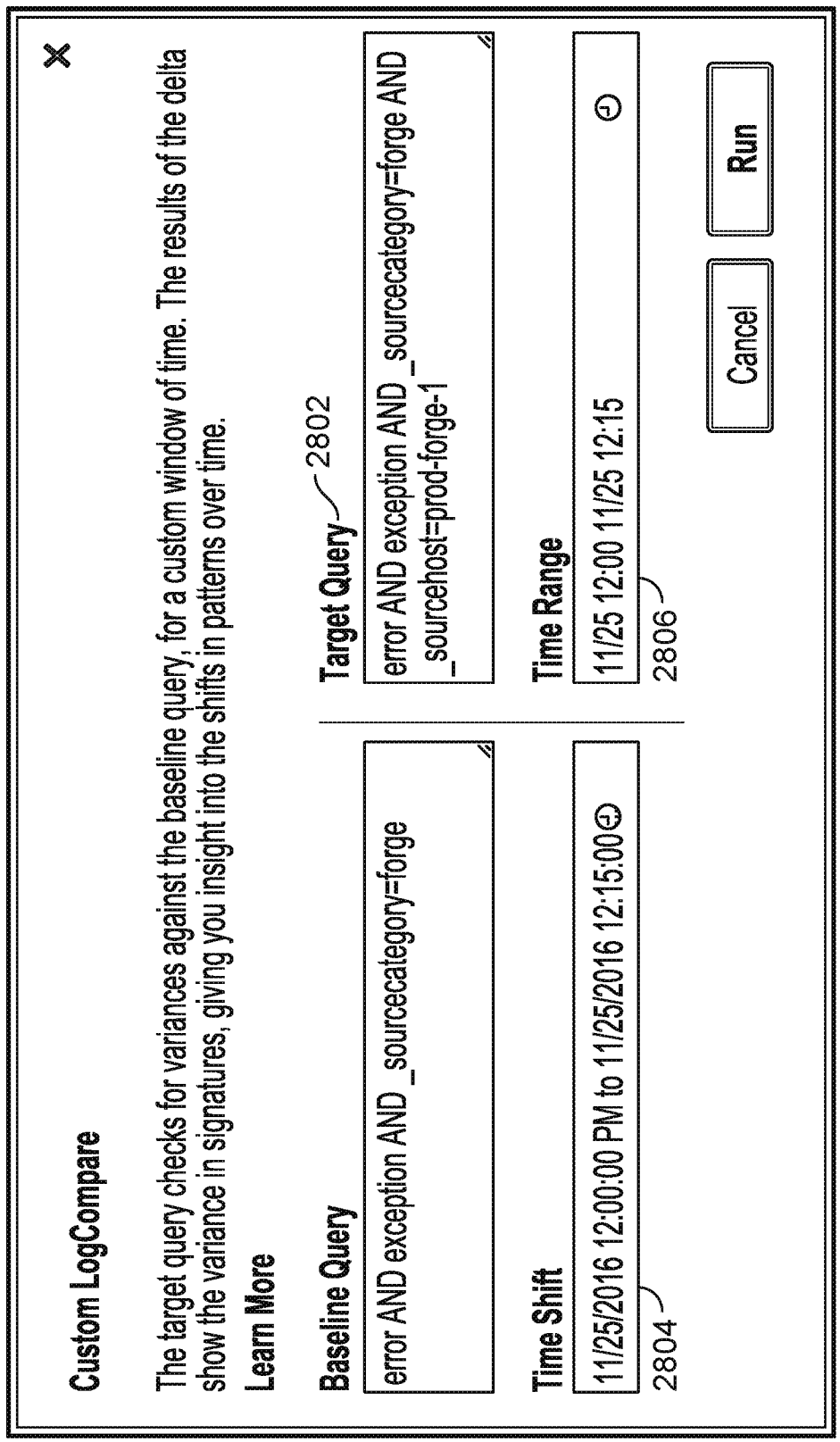
FIG. 28A is an example embodiment of a user interface for specifying delta analysis for a query.

FIG. 27 is an example embodiment of a user interface for customizing log comparison. In some embodiments, the interface of FIG. 27 is provided by platform 2202. Using the example interface of FIG. 27, Alice may flexibly change the time range both for the baseline query (2702) as well as for the target query (2704). Alice may also specify relative expressions (e.g., −24 hours, or −20 days) (e.g., using time shift field 2706). Full time range expressions may also be specified that, for example, include full dates (e.g., using time range field 2708). The same query may then be modified to generate two queries for data in the baseline and target time periods Alice may also easily compare the clustering output of different queries. In the example of FIG. 27, the baseline and target queries will both search for the same type of logs (with both "error" and "exception" and for a particular category), but for different time ranges. Alice may also specify different baseline and target queries (e.g., by manually editing the query expressions in the interface of FIG. 27) that further define the different groups of status information (e.g., log messages) to be compared. For example, Alice may use the same time range for the baseline query, but restrict the baseline query to a particular host/node, to see if during the same time range the behavior of a single host (example of a spatial dimension versus the temporal time range windows) compared to the behavior of all hosts contributing to the "forge" category is significantly different. This allows Alice to easily compare the clustered output of different queries. FIG. 28A is an example embodiment of a user interface for specifying delta analysis for such a query. In some embodiments, the interface of FIG. 28A is provided by platform 2202. In this example, Alice modifies the target query to evaluate the behavior of a single host (e.g., by adding "AND sourehost=prod-forge-1" to the target query at 2802). In this example, Alice has also explicitly specified the baseline time range for both the baseline query and the target query to be the same at 2804 and 2806, respectively. In this example, Alice has defined two groups of log messages that she would like to compare with different baseline and target queries, but the same time period (temporal aspect) of interest (not shifted).

Figure 28B:
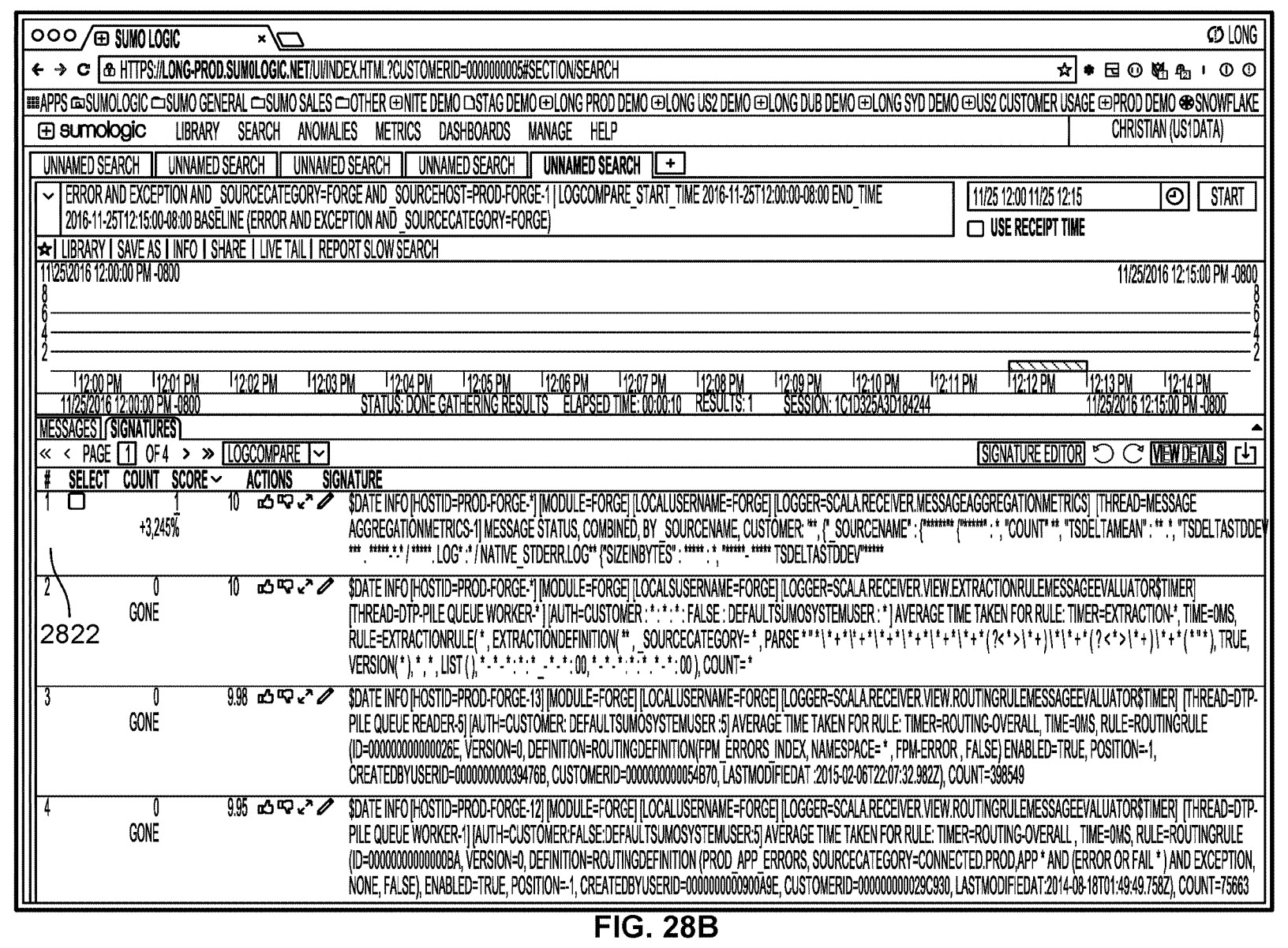
Figure 28B:
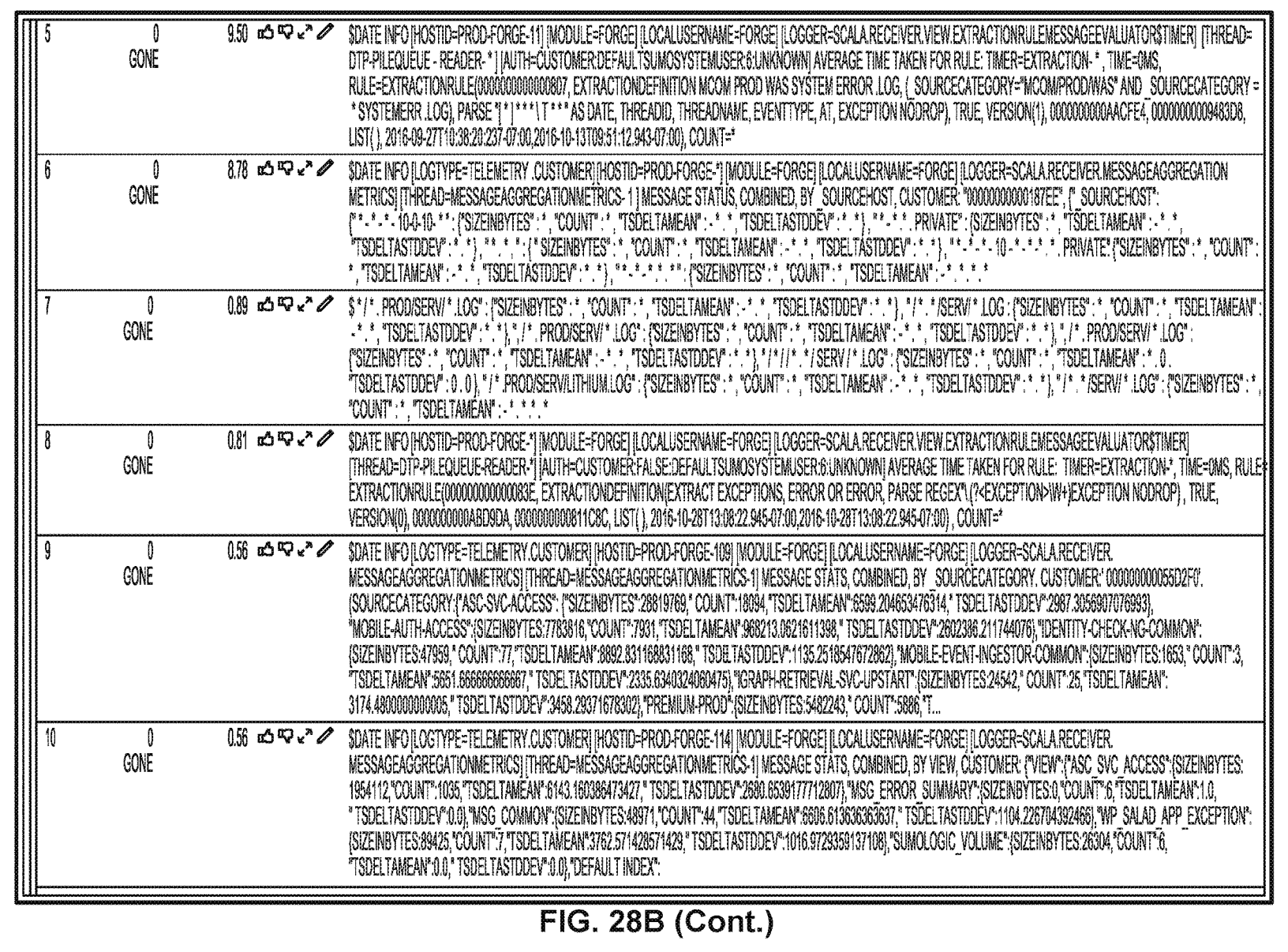

FIG. 28B is an example embodiment of a user interface for displaying delta analysis results. In some embodiments, the delta analysis results are associated with the queries shown in the example interface of FIG. 28A. In some embodiments, the interface of FIG. 28B is provided by platform 2202. The results displayed in the example interface of FIG. 28B shows at 2822 that a particular class of log messages (represented by the corresponding signature) occurs much more frequently on a specific host as compared to all hosts.

Figure 29A:
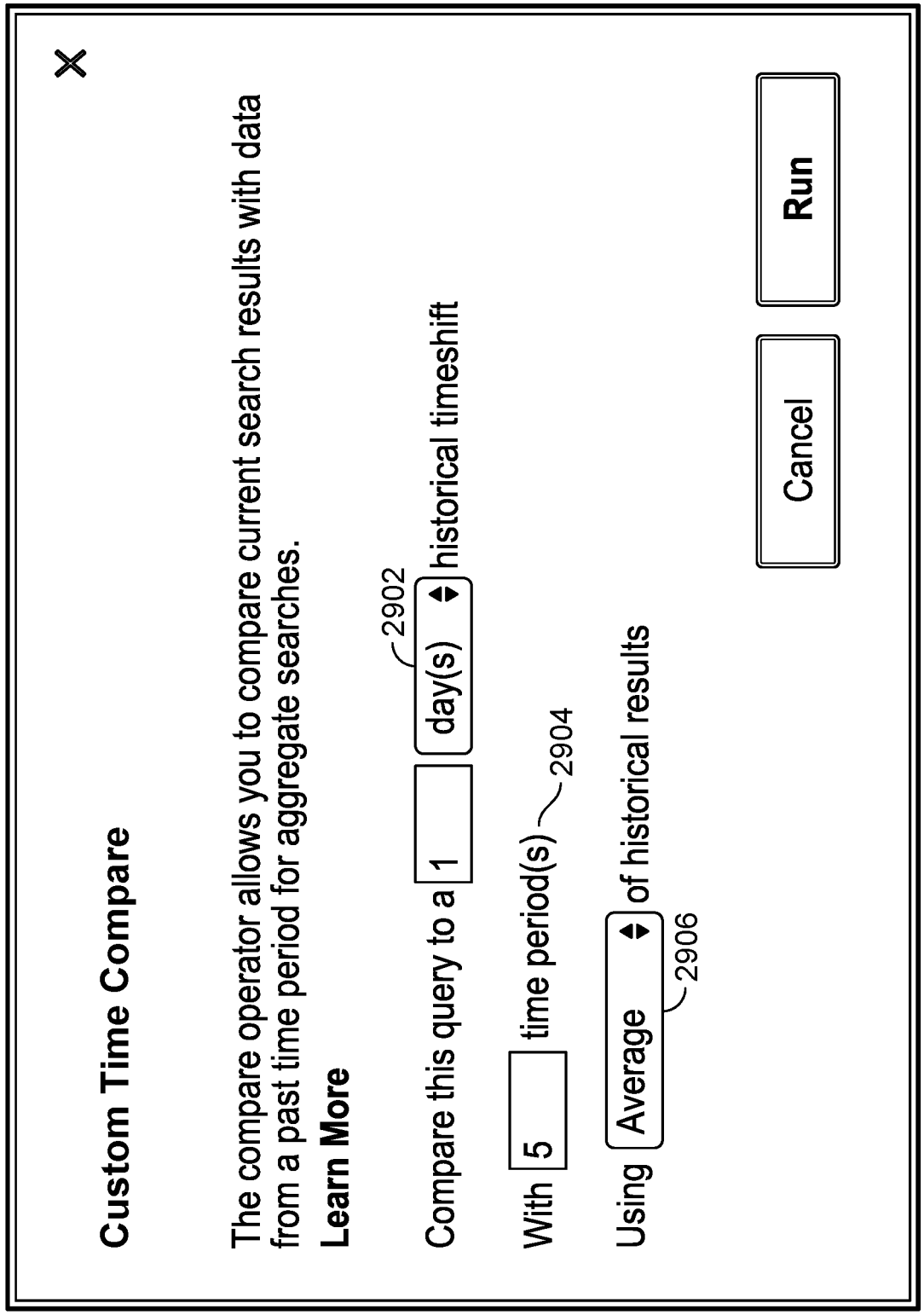
FIG. 29A is an example embodiment of a user interface for customizing log comparison.

FIG. 29A is an example embodiment of a user interface for customizing log comparison. In some embodiments, the interface of FIG. 29A is provided by platform 2202. In this example, a user interface for customizing/configuring time comparison is shown. In some embodiments, the comparison operator shown allows a user to compare current search results with data from a past time period for aggregate searches. Shown in this example are fields for entering customized values for the time comparison. In this example, a user has customized a comparison of a query to a 1 day historical timeshift (2902) with 5 time periods (2904) using an average of historical results (2906).

Figure 29B:
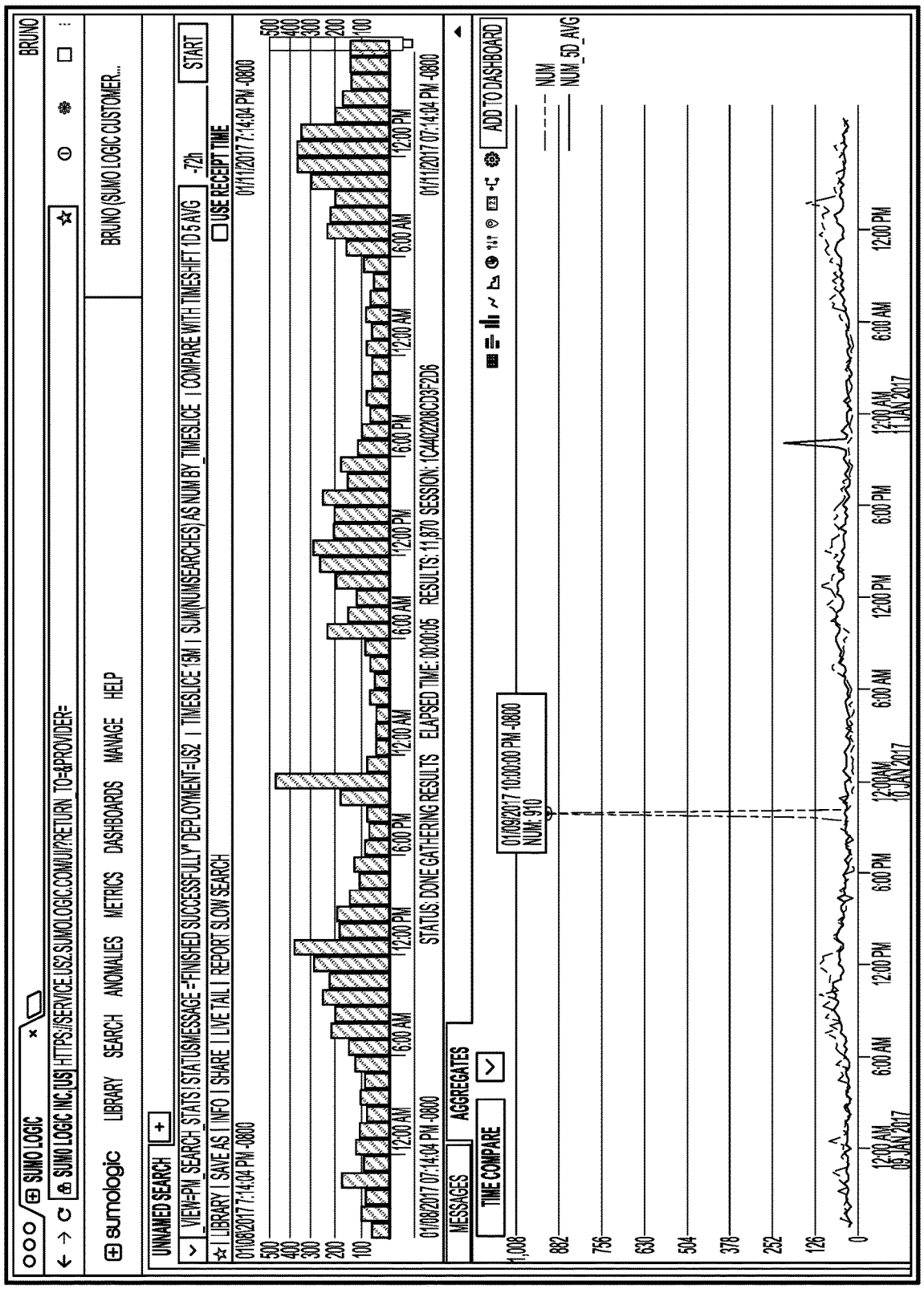
FIG. 29B is an example embodiment of a user interface for displaying delta analysis results.

FIG. 29B is an example embodiment of a user interface for displaying delta analysis results. In some embodiments, the interface of FIG. 29B is provided by platform 2202. FIG. 29B illustrates an alternate embodiment of a user interface displaying the differences in target and baseline query results based on the delta analysis configuration shown in the example interface of FIG. 29A. As shown in this example, an overlay of current query results against query results for one day prior, as specified in the example interface of FIG. 29A, is displayed.

Figure 30:
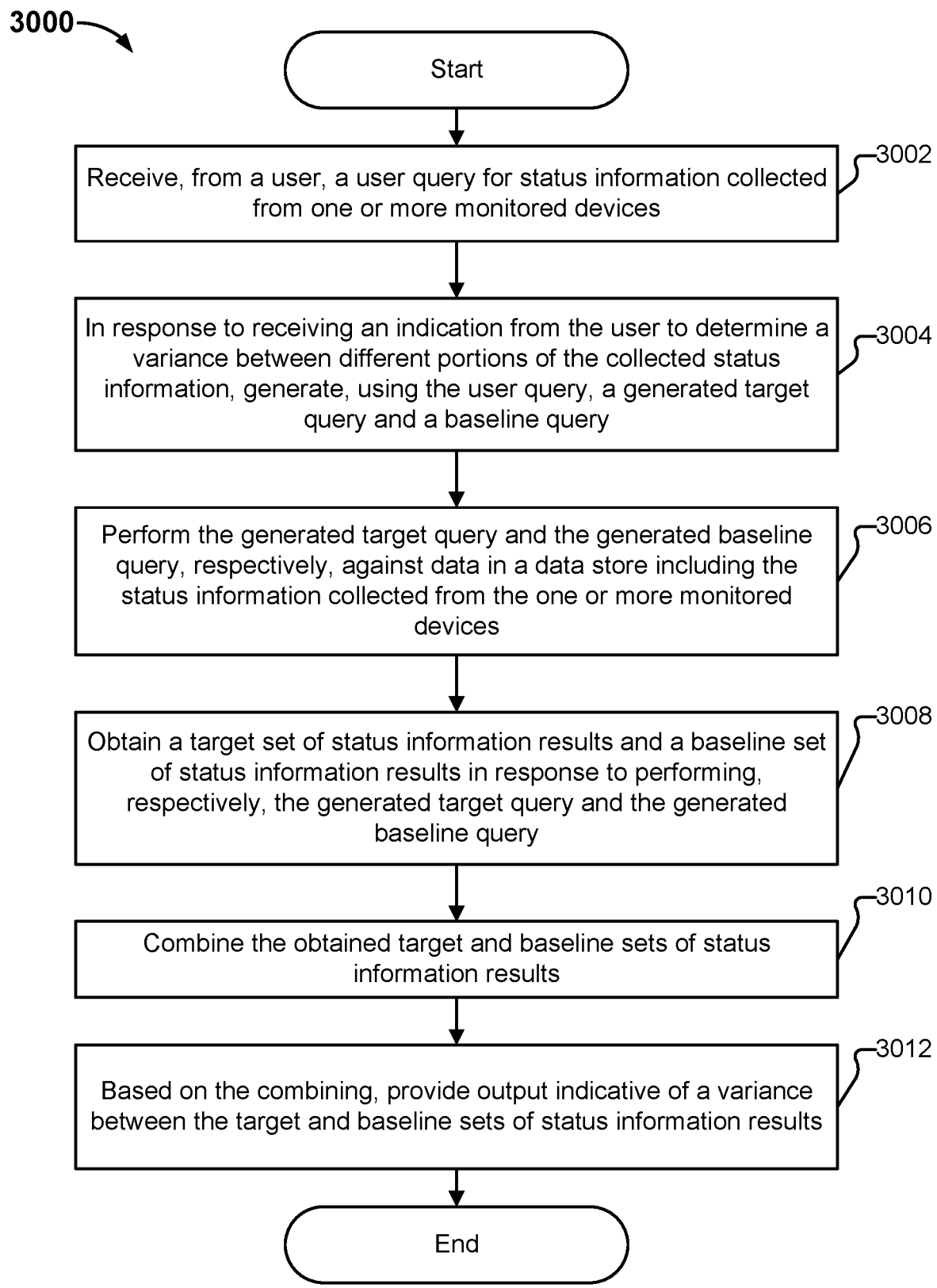
FIG. 30 is a flow diagram illustrating an example embodiment of a process for single click delta analysis.

FIG. 30 is a flow diagram illustrating an example embodiment of a process for single click delta analysis. In some embodiments, process 3000 is executed by platform 2202 of FIG. 22. The process begins at 3002 when a user query for status information collected from one or more monitored devices is received from a user. Examples of such device status information include log messages and metrics collected (e.g., using blades and collectors, as described above) from devices being monitored, as described above. For example, a user enters a query to search for logs and/or metrics collected from monitored devices matching to the parameters of the query, where the user query is provided to platform 2202 via a user interface. Examples of queries are described above.

At 3004, in response to receiving an indication from the user to determine a variance between different portions of the collected status information, a target query and a baseline query are generated using the user query. Results of two or more queries may be compared against each other (i.e., more than two queries may be generated). In some embodiments, the user indication is a selection of a user interface element. In some embodiments, a specification of the groups of status information to be compared is received. As one example, the user clicks a "compare" button in a user interface in order to run the query against data for two different periods of time/time ranges, such that the two different results may be compared (e.g., to determine the delta between the data for the two time ranges). The user can also define or explore other variances, such as between nodes, systems, app instances, groups/subsets/cohorts of users, etc. For example, a target group and baseline group to be compared against each other may be divided on spatial and/or temporal characteristics/behaviors, such as different time ranges/windows, different nodes, different app instances, etc. The target and baseline groups of status information to be compared may be defined based on a specification of a combination of query and spatial/temporal characteristics. For example, the target and baseline queries may be the same query, but with different spatial and/or temporal characteristics or contexts (e.g., different time ranges, different sets of nodes, different cohorts of users, etc.), which will result in two different sets of status information being queried for/requested and returned. In other embodiments, the target and baseline queries are different queries, but with the same spatial and/or temporal characteristics or contexts (e.g., same time range). In other embodiments, the target and baseline queries are different queries with different spatial/temporal characteristics or contexts.

In response to clicking of the button, the user query obtained at 3002 is rewritten. For example, operators (e.g., timeshift operators) are added to the query text of the user query received at 3002 to generate the target and baseline queries.

At 3006, the generated target query and the generated baseline query are performed, respectively, against data in a data store including the status information collected from the one or more monitored devices. As described above, the data in the stored data may include data sources such as log messages and metrics.

At 3008, a target set of status information results and a baseline set of status information results are obtained in response to performing, respectively, the generated target query and the generated baseline query. In some embodiments, the target and baseline sets of results include tables with key and value columns. The contents of the tables may depend on the type of data being queried. For example, if log reduction (i.e., clustering) is requested for the query results, then the results may include tables of signatures with corresponding counts of the number of logs matching to the signature. As another example, the query results may include time series metrics synthesized from log messages (e.g., count, over a time range, of the occurrence of an event that is recorded in log messages). As another example, if the query requested a particular type of metric that was natively collected from monitored devices, then the tables may include values for those metrics.

At 3010, the obtained target and baseline sets of results are combined or correlated. For example, the tables of baseline and target results are joined on a (primary) key column. At 3012, output is provided based at least in part on the combining or correlating or joining. The output may be indicative of a variance between the target and baseline sets of status information results. For example, after joining the baseline and target tables on key columns, such as signatures, time slices, etc., the difference between values and value columns may be determined (i.e., delta analysis is performed), where variances between the target and baseline sets of results (where the variances may be determined relative to the baseline set of results) are determined. For example, the difference in the number of logs included in a class may be determined between the target query results and the baseline query results. As another example, the difference between two time series metrics over a range of time may also be determined. Thus, the results of the target and baseline queries may be compared against each other (and variances/deltas between the query results determined). The determined deltas may then be presented as output, for example, in a user interface, and displayed, rendered, visualized, or otherwise presented to the user, as shown in the example interfaces described herein.

One example of performing process 3000 for delta analysis of log messages is as follows. At 3002, a user query is received (e.g., from a user, via a user interface) for logs matching the parameters of the query. At 3004, an indication is received that the user who submitted the user query would like to perform delta analysis between logs that match the query, but for different temporal/spatial aspects/conditions. For example, the user presses a button indicating that they would like to compare logs in a target time range that match the query parameters against logs in a baseline time range that match the query parameters. The user may further specify/refine the target/baseline with spatial characteristics, such as specifying a target set of nodes and/or a baseline set of nodes. Comparison along other dimensions/behaviors, such as app instances, users, etc. may also be performed. The different groups of log messages to be compared may be defined in a variety of manners, based on a spatial/temporal characteristic, the query itself, or both.

In response to the user input, a target query and a baseline query are generated from the user query received at 3002. For example, the query received at 2902 is modified (e.g., rewritten) to generate two (or more) queries, such as the target query and the baseline query. For example, in response to a user clicking on a comparison button, operator components may be added to the query received at 3002, indicating that the query should be run for two different temporal/spatial aspects.

For example, when comparing logs of different time ranges (where the different time ranges may be selected by a user, selected from a preset, an expression entered by the user, selected by a default, etc.), in response to the user input, the query received at 3002 is rewritten to include comparison/time shift operators. For example, the query text of the user query received at 3002 is rewritten to include an operator component indicating to a platform such as platform 2202 that a comparison is to be performed, and a time shift operator component is added to indicate the time shift of interest (e.g., where the baseline time range is the target time range minus the indicated amount of time to be shifted).

The target query and the baseline query are then generated based on the rewritten user query. In some embodiments, the target query is a modified version of the user query used to search for logs in the target time range (and/or other spatial aspect). The baseline query, in some embodiments, is a modified version of the user query used to search for logs in the baseline time range (and/or other spatial aspect).

At 3006, the generated target and baseline queries are performed against log data in a data store including log messages collected from monitored devices (e.g., collected using blades/collectors, as described above). At 3008, corresponding sets of target results (for logs in the target time range that match the query parameters) and baseline results (for logs in the baseline time range that match the query parameters) are obtained. In some embodiments, clustering is executed for each set of results. For example, as described above, for each set of results, the returned logs are clustered into inferred classes, where each class is associated with a corresponding log signature. In some embodiments, the count of the number of logs included in a cluster is determined for each cluster/class. As one example, a set of results includes two columns, where one column is a column of signatures, and the second column includes the count of the number of logs matching to the signatures.

At 3010, the target and baseline sets of results are combined or correlated. As one example, the column of signatures/class names is treated as a primary key column, and the target and baseline sets of log message results are joined on the signatures/classes. At 3012, output is provided based at least in part on the combining performed at 3010. For example, a variance between the sets of results is determined (e.g., delta analysis is performed), where the variance between the log messages in the target and baseline time ranges is determined. For example, the difference in the count of messages of a class present in both sets of results is determined. A difference score indicating how different a signature in the target set of results is from a signature in the baseline set of results may also be computed (e.g., to determine a shift in patterns in the log messages over time). As another example, it is determined whether one class is present in one set of results but not the other. In some embodiments, the differences/variances are determined relative to the baseline set of results. In some embodiments, a joined table (resulting from the joining on signature/class of the target and baseline sets of results) includes the computed variances. The results of the delta analysis may then be provided as output. For example, the computed variances may be displayed to a user via a user interface. As another example, a plot of the differences, over the same length window of time (e.g., for the same 15 minute period, but 24 hours apart) may be displayed, as described above.

Logs Transformed to Time Series (Time Series Synthesized from Logs)

Figure 31:
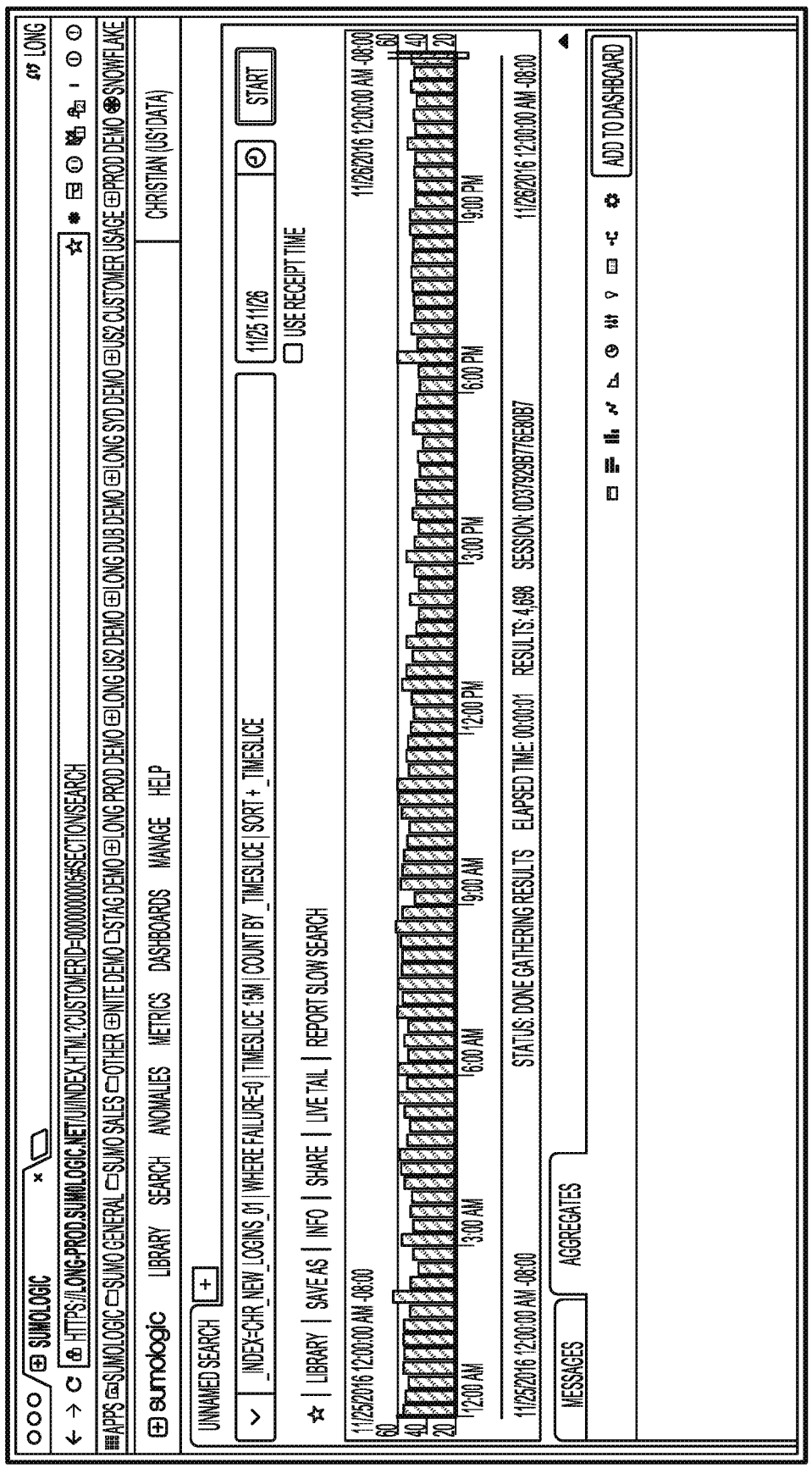
FIG. 31 is an example embodiment of a user interface illustrating results of a query.
Figure 31:
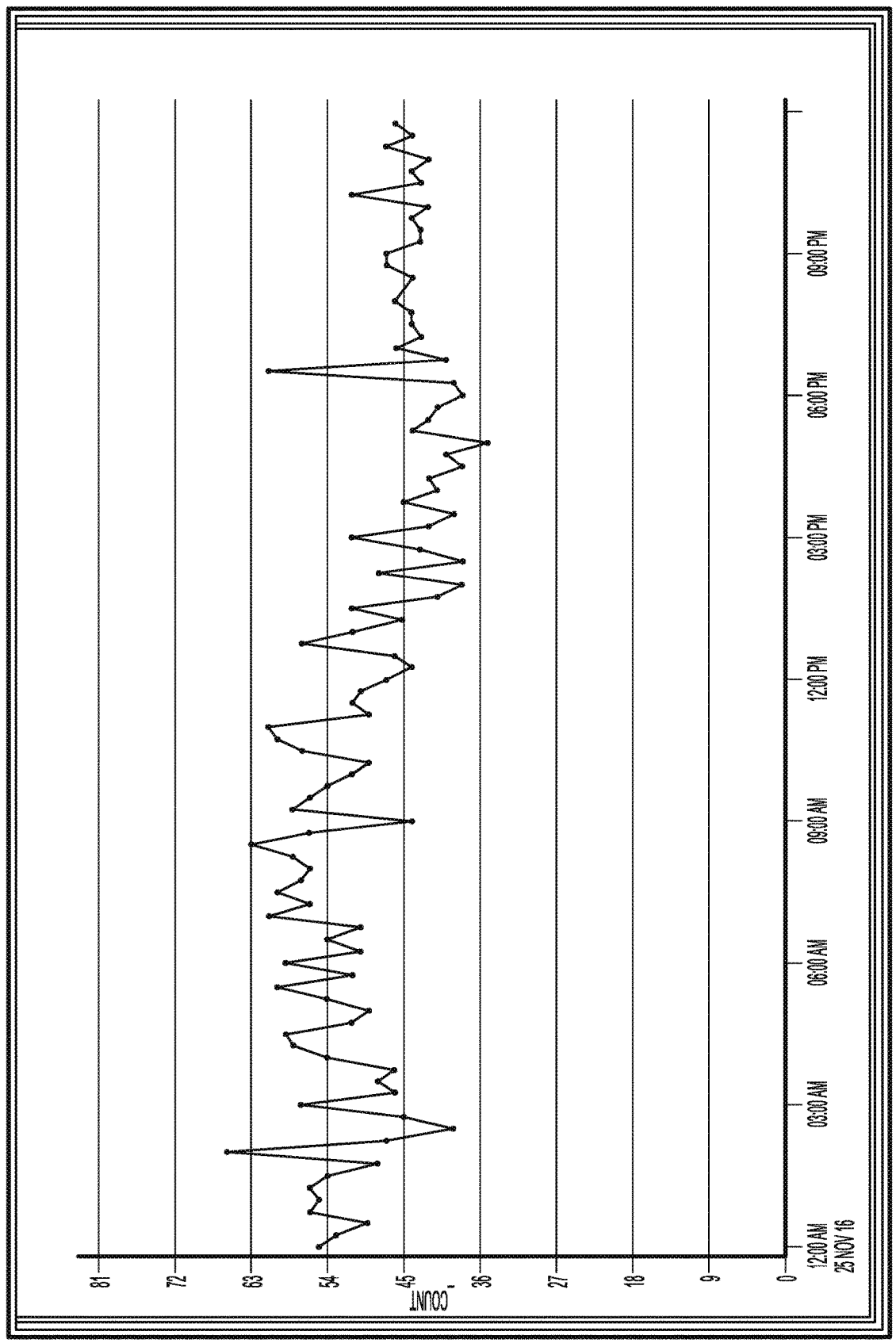

In some cases, logs may transport times, or an aggregation over logs produces a time series. For example, suppose that log messages are obtained for every login by a user into a system. In this example, the query "_index=chr_new_login_01|where failure=0|timeslice 15 m|count by_timeslice|sort+_timeslice" uses the index created to hold just log messages for logins, filters out failed logins, and then counts the number of logins in 15 minute buckets. Thus, a count (time series metric) has been derived from logs based on the specification/parameters of the query. In some embodiments, the synthesized time series metrics are stored to a time series data store in platform 2202. The time series metrics (i.e., values obtained at intervals of time) may be synthesized dynamically, on the fly based on the query (e.g., according to the type of quantity of interest being queried, in this case the number of successful new logins). FIG. 31 is an example embodiment of a user interface illustrating results of the aforementioned query. In some embodiments, the interface of FIG. 31 is provided by platform 2202. As shown in this example is a plot (3102) of the messages over the time range (last 24 hours) at a granularity of 15 minutes (e.g., the count of the metrics is aggregated in 15 minute time slices and plotted/displayed in 15 minute intervals).

Users may be interested in understanding how the login behavior has changed during the day (e.g., a Friday over Thanksgiving 2016) as compared to the week before. In some embodiments, similarly to the "Log Compare" single click delta analysis button described above, the techniques described herein may be used such that a user may invoke a button that allows an operator to be added to a query that allows for comparison for the time series query against another time range.

Figure 32:
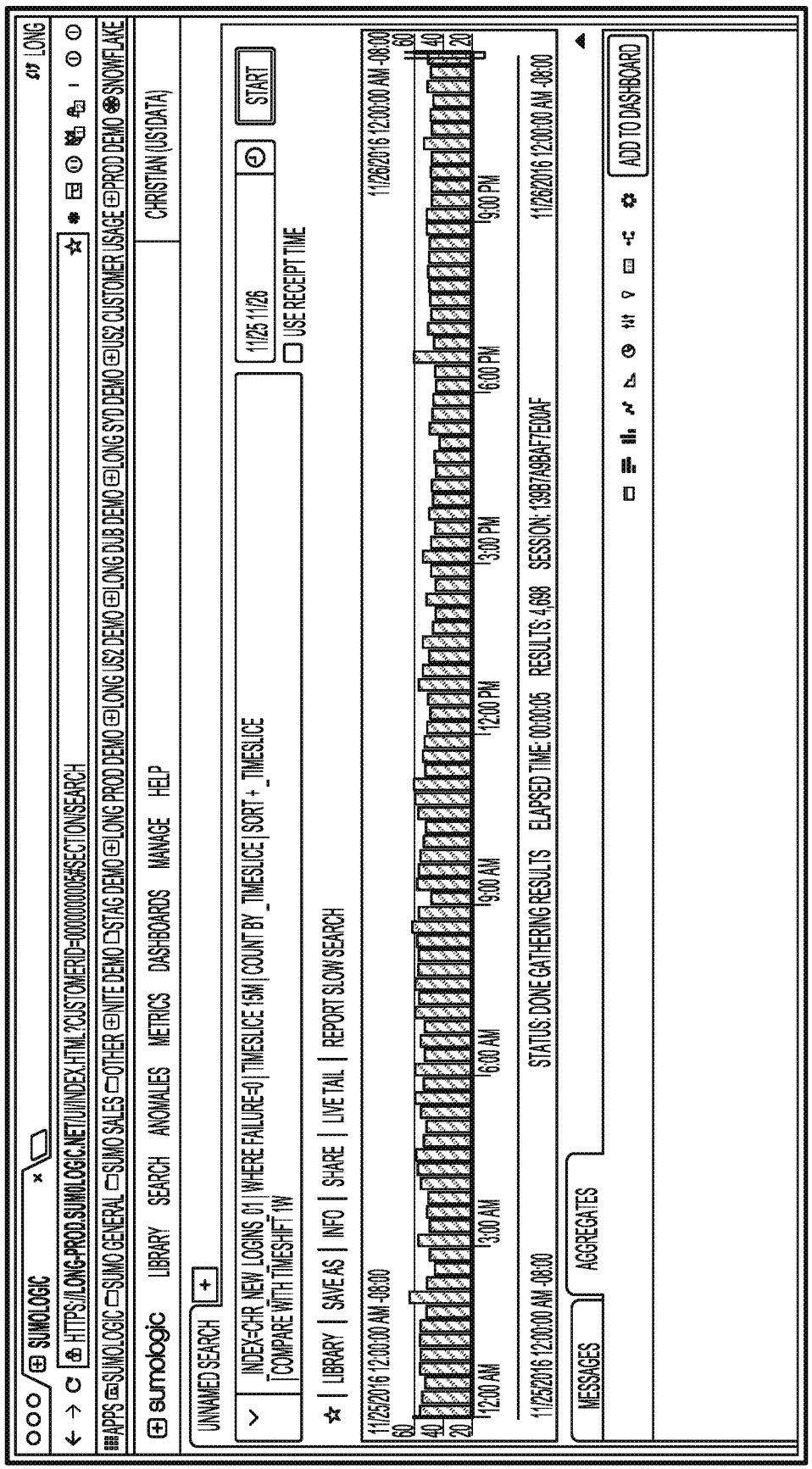
FIG. 32 is an example embodiment of an interface for displaying comparison of time series synthesized from logs.
Figure 32:
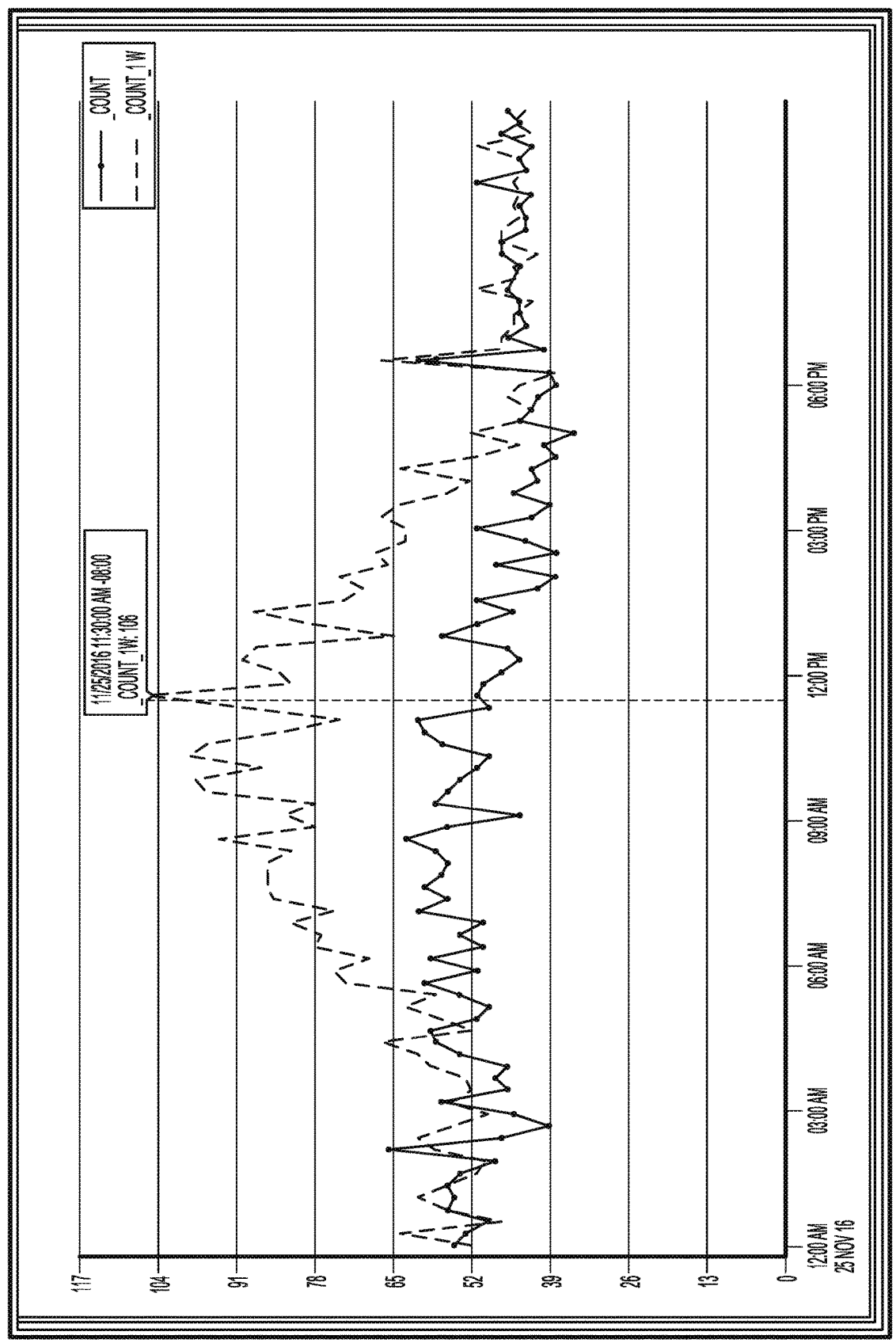

FIG. 32 is an example embodiment of an interface for displaying comparison of time series synthesized from logs. In some embodiments, the interface of FIG. 30 is provided by platform 2202. In this example, the effect of the holiday affecting the number of logins can be viewed. As shown in this example, the metric, number of logins, is a time series that is derived from the log messages. For example, the number of occurrences of logins in the log messages is counted over a period of time (e.g., 24 hours) and aggregated at an interval (e.g., 15 minute intervals or time slices), resulting in a time series. Comparison of the derived metrics between two different time ranges may then be performed by entering a relevant query and invoking single click delta analysis (e.g., with a button press that initiates the query rewriting processing described above). The number of logins for two days, one week apart may then be plotted over a 24 hour window, at the same 15 minute increments, to view how login behavior has changed during the target holiday day versus the baseline day one week before. Thus, the effect of the holiday impacting the number of logins can be easily viewed.

In some embodiments, the count of log messages over a period of time at successive intervals, as described in the above examples of FIGS. 22-29B is also an example of a derived or synthesized time series metric, where the time series metric is the count of the number of log messages, over the fifteen minute window (e.g., at one minute intervals, where a count of log messages in each interval is computed), that match the parameters of the query submitted by the user. The total count over a time range is the aggregate of the count over the 15 minutes of the time range of interest (whether target or baseline).

One example of performing process 3000 for delta analysis of time series metrics synthesized from log messages is as follows. At 3002, a user query is received. In some embodiments, the user query indicates a metric of interest to be computed from logs matching parameters of the query. As one example, the query is an expression that identifies an index created to maintain log messages of a certain type (or meeting certain criteria). The query expression may also include a time range or interval or slice. The query expression may also indicate that a count of the number of log messages that are included in the index, over the time slice, should be computed, resulting in a time series metric. The query may also include filter parameters for filtering out certain types of logs from the count. An example of such a query expression for determining or producing a time series (by performing an aggregation over logs) is described in conjunction with FIGS. 31 and 32.

At 3004, a user input is received indicating that the user would like to compare time series metrics in a target group with time series metrics in a baseline group. The target group and baseline group of time series metric values to be compared may be divided on spatial and/or temporal characteristics/behaviors, such as different time ranges/windows, different nodes, different app instances, etc., and/or different queries. Target and baseline queries are generated, for example, by rewriting the user query to include additional operator components. At 3006, the target and baseline queries are performed against a data store including log messages. At 3008, for each of the target and baseline queries, corresponding target and baseline sets of results are obtained. For example, the target query is performed against log messages. Log messages that match the query and the target characteristic (e.g., target time window) are obtained. The obtained log messages are transformed or otherwise synthesized into a time series according to the target query, which may specify the type of metric to be determined (e.g., count of an event recorded in log messages that match the parameters of the query). A baseline set of results corresponding to the baseline query is similarly obtained. The target and baseline sets of results may be implemented as tables, as described above. At 3010, the obtained target and baseline sets of results are combined or correlated, for example, by joining the target results table with the baseline results table on time slice as a key. At 3012, output is provided based on the correlation. For example, if the target and baseline time series metrics are to be compared for different time windows, then the difference (e.g., in value) between the target and baseline metrics over the time window (e.g., for each interval of time into which the time window is segmented) may be determined/compared. In some embodiments, plots of the time series over the window of time may be overlaid on top of each other to allow visual comparison of the metric over the two time ranges.

Natively Collected Metrics

In the above example, time series metrics derived or otherwise synthesized from logs were compared (i.e., delta analysis was performed) with a single click. In other embodiments, platform 2202 may collect, process, and analyze time series metrics provided directly from telemetry-providing sources (e.g., natively generated time series metrics such as central processing unit (CPU) metrics for a host, etc.), without having to synthesize the time series from logs, as described above. In some embodiments, the collected metrics are stored to a metrics data store in platform 2202. Using the techniques described herein, a "compare" button may be added in a user interface that allows a user, with a single click, to compare time series metrics.

One example of performing process 3000 for delta analysis of natively collected metrics is as follows. At 3002, a user query is received. In some embodiments, the user query indicates a metric(s) of interest that has been collected from monitored devices. At 3004, a user input is received indicating that the user would like to compare the metric in a target group with metric in a baseline group. The target group and baseline group may be divided on spatial and/or temporal characteristics/behaviors, such as different time ranges/windows, different nodes, different app instances, etc., and/or different queries, as described above. Target and baseline queries are generated, for example, by rewriting the user query to include additional operator components. At 3006, the target and baseline queries are performed against a data store including collected metrics. At 3008, for each of the target and baseline queries, corresponding target and baseline sets of results are obtained. For example, a set of metrics values corresponding to the target query with a target characteristic (e.g., target time window) are obtained. A baseline set of results corresponding to the baseline query is similarly obtained. The target and baseline sets of results may be implemented as tables, as described above. At 3010, the obtained target and baseline sets of results are combined or correlated, for example, by joining the target results table with the baseline results table on time slice as a key. At 3012, output is provided based on the correlation. For example, if the target and baseline time series metrics are to be compared for different time windows, then the difference between the target and baseline metric values over the time window (e.g., for each interval of time into which the time window is segmented) may be determined/computed. As another example, plots for the different time series over the window of interest (e.g., same time window, but shifted by a period of time) may be displayed.

Additional Details Regarding Single Click Delta Analysis

As described above, using the techniques described herein, single click delta analysis may be performed for comparing log messages, synthesized metrics, and natively generated metrics. The techniques described herein may variously be adapted to accommodate any other types of data or contexts.

For example, instead of/in addition to log data and time series data, single click delta analysis can be performed on any other type of data, such as event, activity, occurrence, or any statistical function applied to one or more time-windows.

As described above, default periods can be customizable. For example, time ranges may be setup to compare to the previous hour or year or any other cyclical or even predefined but irregular pattern.

In some embodiments, instead of or in addition to delta-analysis, the techniques described herein can be extended to anomaly-analysis, or more generically, "single-click comparative data-analysis".

In some embodiments, the baseline can be selected automatically by what is referred to herein as a "cyclicality detection algorithm," where, for example, the user directs platform 2202 to compare a result for a specific period to previous N periods. In some embodiments, the N number of periods is selected by the user. In other embodiments, the period duration is automatically detected from historic data.

In some embodiments, as described above, the baseline/target division can be a dimension other than time. For example, a user can use behavior characteristics of one host/node/app-instance/etc. vs. another (or one vs. a bunch, or one installation vs. another).

In various embodiments, delta analysis can span:

Signature based-deltas (e.g. logreduce/summarize)

Statistical deltas (e.g., outlier, aggregation statistics analysis)

Behavioral deltas (e.g., based on some future state behavioral modeling)

Global deltas (e.g. comparing behavior of one customer to that of other customers of the system, which can be performed anonymously)

This, for example, would allow a customer to determine whether their Apache node behaves differently than any other Apache nodes running for other customers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive, from a user, a first query for status information collected from a plurality of nodes and stored in a data store;
collect the status information from the data store based on the first query;
present the status information on a user interface;
receive, via the user interface, a user request to determine a variance between the collected status information for a first node and the collected status information for other nodes in the plurality of nodes, wherein the status information includes a plurality of logs messages or metrics collected from the first node and a plurality of log messages or metrics collected from the other nodes;

modify, in response to the user request, the first query to obtain a second query for the first node, wherein modifying the first query to obtain the second query comprises rewriting the first query to include a set of operator components for the first node to obtain the second query;

modify the first query to obtain a third query for the other nodes, wherein modifying the first query to obtain the third query comprises rewriting the first query to include a set of operator components for the other nodes to obtain the third query;

receive a first set of status information results and a second set of status information results from the data store in response to performing, respectively, the second query and the third query against data in the data store;

determine a variance between the first set of status information results and the second set of status information results; and present, via the user interface, information on the variance between the first node and the other nodes; and a memory coupled to the one or more processors and configured to provide the one or more processors with instructions.

2. The system of claim 1, wherein the user request comprises a selection of a user interface element.

3. The system of claim 1, wherein the first and second sets of status information results are divided based on a spatial characteristic based on the node that generated the logs messages or metrics.

4. The system of claim 1, wherein the user request further comprises requesting variance for at least one of a time window and a cohort of users.

5. The system of claim 1, wherein the first and second sets of status information results comprise tables, and wherein the one or more processors are further configured to join the first and second sets of status information results on a key column.

6. The system of claim 1, wherein the second query and the third query generated from the first query comprise a same query, associated with different nodes.

7. The system of claim 1, wherein the second query and the third query generated from the first query comprise different queries associated with different nodes.

8. The system of claim 1, wherein the first query comprises a query for log messages, and wherein the user request comprises an indication to compare a first group of log messages from the first node against a second group of log messages from the other nodes.

9. The system of claim 8, wherein the first and second sets of status information results comprise first and second sets of log messages.

10. The system of claim 9, wherein the one or more processors are further configured to cluster the first set of log messages and to cluster the second set of log messages, and wherein a cluster is associated with a corresponding signature comprising a template for log messages included in the cluster.

11. The system of claim 10, wherein the one or more processors are further configured to determine a count of a number of log messages in a given cluster.

12. The system of claim 11, wherein the one or more processors are further configured to join, based at least in part on signatures, the first set of clustered log messages and the second set of clustered log messages.

13. The system of claim 12, wherein determining the variance between the first set of status information results and the second set of status information results comprises determining at least one of a difference in a number of logs in a given cluster, a presence of a cluster in the first set of status information results but not in the second set of status information results, and a presence of a cluster in the second set of status information results but not the first set of status information results.

14. A method, comprising:
receiving, from a user, a first query for status information collected from a plurality of nodes and stored in a data store;
collecting the status information from the data store based on the first query;
presenting the status information on a user interface;
receiving, via the user interface, a user request to determine a variance between the collected status information for a first node and the collected status information for other nodes in the plurality of nodes, wherein the status information includes a plurality of logs messages or metrics collected from the first node and a plurality of log messages or metrics collected from the other nodes;
modifying, in response to the user request, the first query to obtain a second query for the first node, wherein modifying the first query to obtain the second query comprises rewriting the first query to include a set of operator components for the first node to obtain the second query;
modifying the first query to obtain a third query for the other nodes, wherein modifying the first query to obtain the third query comprises rewriting the first query to include a set of operator components for the other nodes to obtain the third query;
receiving a first set of status information results and a second set of status information results from the data store in response to performing, respectively, the second query and the third query against data in the data store;
determining a variance between the first set of status information results and the second set of status information results; and
presenting, via the user interface, information on the variance between the first node and the other nodes.

15. A computer program product embodied in a non-transitory computer readable storage medium and comprising computer instructions for:
receiving, from a user, a first query for status information collected from a plurality of nodes and stored in a data store;
collecting the status information from the data store based on the first query;
presenting the status information on a user interface;
receiving, via the user interface, a user request to determine a variance between the collected status information for a first node and the collected status information for other nodes in the plurality of nodes, wherein the status information includes a plurality of logs messages or metrics collected from the first node and a plurality of log messages or metrics collected from the other nodes;
modifying, in response to the user request, the first query to obtain a second query for the first node, wherein modifying the first query to obtain the second query comprises rewriting the first query to include a set of operator components for the first node to obtain the second query;

modifying the first query to obtain a third query for the other nodes, wherein modifying the first query to obtain the third query comprises rewriting the first query to include a set of operator components for the other nodes to obtain the third query;

receiving a first set of status information results and a second set of status information results from the data store in response to performing, respectively, the second query and the third query against data in the data store;

determining a variance between the first set of status information results and the second set of status information results; and presenting, via the user interface, information on the variance between the first node and the other nodes.

* * * * *

UNITED STATES PATENT AND TRADEMARK OFFICE
CERTIFICATE OF CORRECTION

| | | |
|---|---|---|
| PATENT NO. | : 12,032,637 B2 | Page 1 of 1 |
| APPLICATION NO. | : 17/383066 | |
| DATED | : July 9, 2024 | |
| INVENTOR(S) | : Amel et al. | |

It is certified that error appears in the above-identified patent and that said Letters Patent is hereby corrected as shown below:

On the Title Page

On page 2, in Column 2, under "Other Publications", Line 56, delete "2014"," and insert --2017",-- therefor In the Claims In Column 35, Line 43, in Claim 6, delete "query," and insert --query-- therefor Signed and Sealed this
Twenty-sixth Day of August, 2025

Coke Morgan Stewart
*Acting Director of the United States Patent and Trademark Office*